United States Patent
Tadayon et al.

(10) Patent No.: US 11,463,842 B2
(45) Date of Patent: Oct. 4, 2022

(54) METHOD AND APPARATUS FOR CHIRP SIGNAL-BASED POSE ESTIMATION

(71) Applicants: Navid Tadayon, Kanata (CA); Alireza Bayesteh, Ottawa (CA)

(72) Inventors: Navid Tadayon, Kanata (CA); Alireza Bayesteh, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 64 days.

(21) Appl. No.: 17/064,733

(22) Filed: Oct. 7, 2020

(65) Prior Publication Data
US 2022/0109951 A1    Apr. 7, 2022

(51) Int. Cl.
*H04W 4/029*    (2018.01)
*H04B 1/69*    (2011.01)
*G01S 13/82*    (2006.01)

(52) U.S. Cl.
CPC ............ *H04W 4/029* (2018.02); *H04B 1/69* (2013.01); *G01S 13/82* (2013.01); *H04B 2001/6912* (2013.01)

(58) Field of Classification Search
CPC ................................. H04W 4/029; H04B 1/69
USPC ........................................................ 455/456.1
See application file for complete search history.

(56) References Cited

U.S. PATENT DOCUMENTS

| | | | |
|---|---|---|---|
| 2003/0133496 A1* | 7/2003 | Hooton | H04B 1/69 375/259 |
| 2008/0233960 A1 | 9/2008 | Kangude et al. | |
| 2020/0130697 A1* | 4/2020 | Insana | G01S 13/584 |
| 2020/0225332 A1 | 7/2020 | Wagner et al. | |
| 2020/0333436 A1* | 10/2020 | Insana | G01S 13/449 |

FOREIGN PATENT DOCUMENTS

| | | |
|---|---|---|
| CN | 109581301 A | 4/2019 |
| EP | 2924500 A1 | 9/2015 |
| WO | 0021093 A1 | 4/2000 |
| WO | 2012129089 A1 | 9/2012 |

OTHER PUBLICATIONS

Braun, Martin et al., "Maximum Likelihood Speed and Distance Estimation for OFDM Radar", Proc. 2010 IEEE Radar Conf., Washington, DC, May 2010, pp. 256-261.

* cited by examiner

*Primary Examiner* — Ted M Wang

(57) ABSTRACT

Some embodiments of the present disclosure provide a transmit point that transmits a downlink chirp sensing waveform (DL CSW) signal. A device receives the DL CSW signal and obtains a cloned chirp sensing waveform. The cloned chirp sensing waveform includes a parameter that can be uniquely associated with the device. The device transmits a UL cloned CSW signal based on the cloned chirp sensing waveform. The transmit point receives the UL cloned CSW signal and processes the UL cloned CSW signal to estimate a pose for the device and associate the estimated pose with the identity of the device.

20 Claims, 16 Drawing Sheets

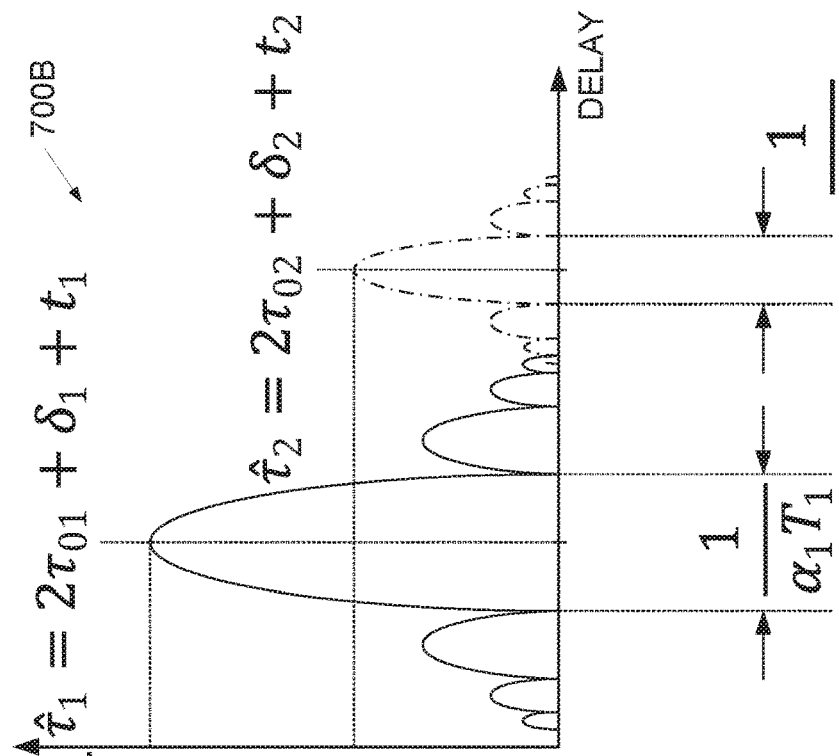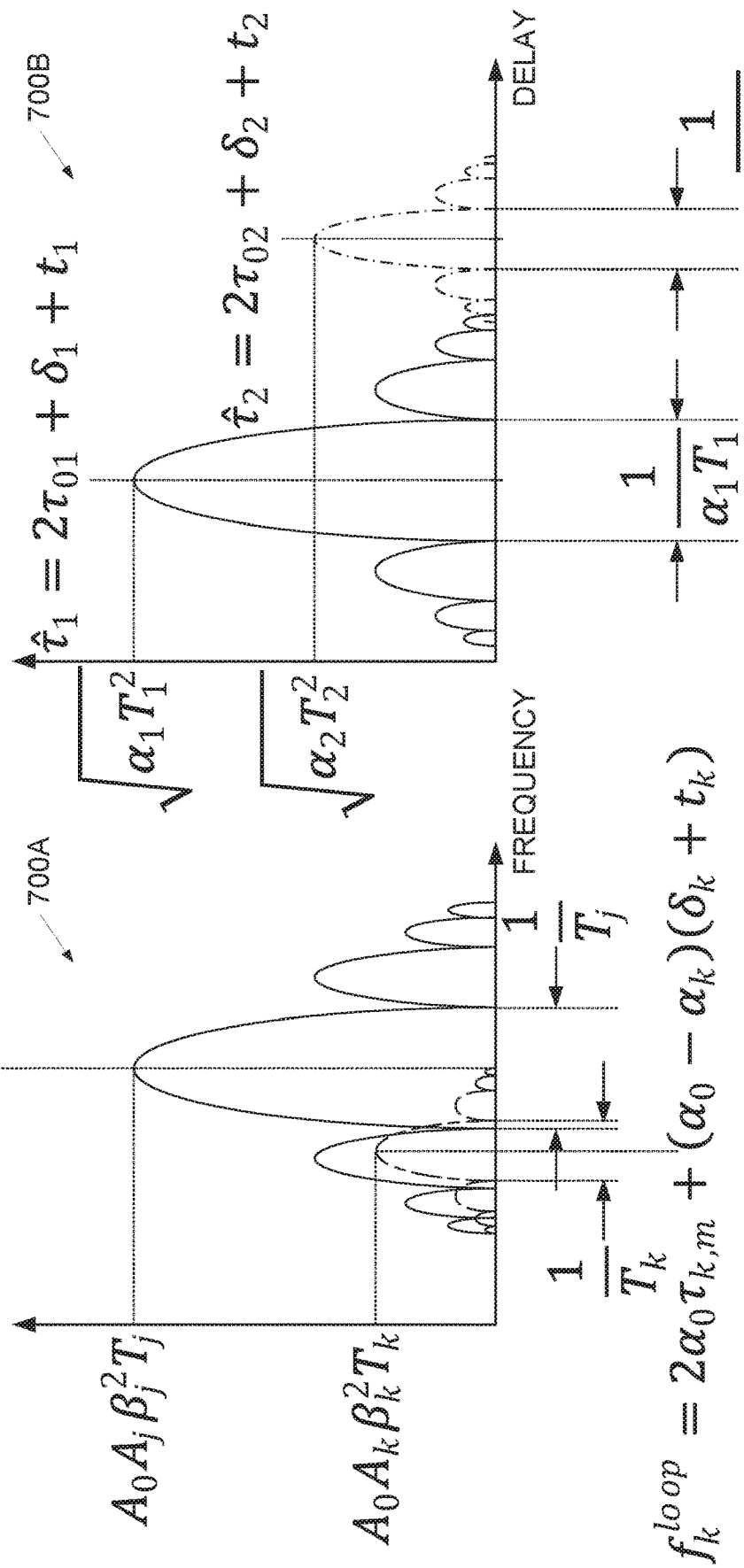
FIG. 7A
FIG. 7B

METHOD AND APPARATUS FOR CHIRP SIGNAL-BASED POSE ESTIMATION

TECHNICAL FIELD

The present disclosure relates generally to pose estimation and, in particular embodiments, processing a chirp signal to facilitate pose estimation.

BACKGROUND

User Equipment (UE) position information is often used in cellular communication networks to improve various performance metrics for the network. Such performance metrics may, for example, include capacity, agility and efficiency. The improvement may be achieved when elements of the network exploit the position, the behavior, the mobility pattern, etc., of the UE in the context of a priori information describing a wireless environment in which the UE is operating.

The problem of accurately estimating a position of a UE using radio frequency (RF) waves is of prime importance nowadays. Global Positioning System (GPS) has been used for decades to estimate the location of UEs. Despite this success, GPS suffers from unavailability in indoor environments, underground tunnels, bad weather conditions, and highly multipath outdoor settings.

Information about the orientation of a device may also be useful for improving overall network performance. Estimation of position and orientation is known as pose estimation. RF sensing systems, such radar, are a known deployment for pose estimation. While pose estimation in communication networks is desirable, known approaches that integrate communication and sensing systems suffer from notable drawbacks.

SUMMARY

It is known that passive positioning strategies excel in synchronization and resolution yet suffer from issues related to associating observations to the devices that are observed and issues related to clutter in the environment. Conventional integration of those passive positioning strategies into communication systems fail to resolve these issues. For example, communication systems that use a communication waveform (e.g., an Orthogonal Frequency Division Multiplexing waveform) to perform radar sensing can still fail to address the problem of associating observations with the observed device. Moreover, known integrated communication and sensing systems fail to take into account a multi-agent setting where multiple objects/UEs are to be sensed. These known systems may be unsuitable for sensing long-distance UEs/objects due to SNR limitations.

Aspects of the present application combine elements of a passive positioning strategy and elements of an active positioning strategy in a manner that manages to mitigate issues related to each of the positioning strategies while exploiting strengths of each of the positioning strategies. The use of a chirp sensing waveform (CSW) signal allows devices to process segments of the CSW signal in a manner that may be tailored to the capabilities of the device.

Some embodiments of the present disclosure provide a transmit point that transmits a downlink (DL) chirp sensing waveform (CSW) signal. A device receives the DL CSW signal and obtains a cloned chirp sensing waveform. The cloned chirp sensing waveform includes a parameter that can be uniquely associated with the device. The device transmits an uplink (UL) cloned CSW signal based on the cloned chirp sensing waveform. The transmit point receives the UL cloned CSW signal and processes the UL cloned CSW signal to estimate a pose for the device and associate the estimated pose with the identity of the device.

According to a first aspect of the present disclosure, there is provided a method of facilitating pose estimation of an apparatus. The method includes the apparatus receiving a chirp sensing waveform signal. The chirp sensing waveform signal has a first frequency bandwidth. The method further includes the apparatus transmitting a cloned chirp sensing waveform signal based on a portion of the received chirp sensing waveform signal. The cloned chirp sensing waveform signal has a second frequency bandwidth less than the first frequency bandwidth. The portion of the received chirp sensing waveform signal can be uniquely associated with the apparatus.

Advantageously, this first aspect may be performed entirely in the analog domain, reducing processing latency and complexity. Alternatively, the first aspect may be partly performed in the digital domain, potentially simplifying implementation as compared to the fully analog embodiment. The partly digital embodiment may still enjoy performance benefits over conventional active positioning solutions, which require much more processor intensive operations.

In an embodiment based on the first aspect, the apparatus receives a configuration message prior to receiving the chirp sensing waveform signal. The configuration message is for indicating the portion of the received chirp sensing waveform uniquely associated with the apparatus. In a further embodiment, the configuration message comprises a gating delay and a cloning duration for indicating the portion of the received chirp sensing waveform uniquely associated with the apparatus.

In an embodiment based on the first aspect or on any previous embodiment, the cloned chirp sensing waveform signal is further based on a modified chirping coefficient of the received chirp sensing waveform signal. The modified chirping coefficient can be uniquely associated with the apparatus.

In an embodiment based on the first aspect or on any previous embodiment, the cloned chirp sensing waveform signal is further based on a deferment delay of the received chirp sensing waveform signal. The deferment delay can be uniquely associated with the apparatus.

In an embodiment based on the first aspect or on any previous embodiment, the cloned chirp sensing waveform signal is further based on a combination of the received chirp sensing waveform signal and an orthogonalization code uniquely associated with the apparatus. In a further embodiment, the orthogonalization code comprises a Paging Radio Network Temporary Identifier.

According to a second aspect of the present disclosure, there is provided an apparatus for carrying out the method of the first aspect or any embodiment thereof.

According to a third aspect of the present disclosure, there is provided a method of facilitating pose estimation of an apparatus. The method includes a base station transmitting a chirp sensing waveform signal. The chirp sensing waveform signal has a first frequency bandwidth. The method further includes the base station receiving a cloned chirp sensing waveform signal from an apparatus. The cloned chirp sensing waveform signal is based on a portion of the transmitted chirp sensing waveform signal. The cloned chirp sensing waveform signal has a second frequency bandwidth less than the first frequency bandwidth. The portion of the transmitted chirp sensing waveform signal can be uniquely associated with the apparatus.

In an embodiment based on the third aspect, the base station transmits a configuration message to the apparatus. The configuration message is for indicating the portion of the transmitted chirp sensing waveform uniquely associated with the apparatus. In a further embodiment, the configuration message comprises a gating delay and a cloning duration for indicating the portion of the transmitted chirp sensing waveform uniquely associated with the apparatus.

According to a fourth aspect of the present disclosure, there is provided an apparatus for carrying out the method of the third aspect or any embodiment thereof.

According to another aspect of the present disclosure, there is provided an apparatus for carrying out the method. The apparatus includes a receive antenna configured to receive a downlink chirp sensing waveform signal, the downlink chirp sensing waveform signal associated with a first chirping coefficient, an oscillator configured to generate a first reference signal and a second reference signal, a first multiplier configured to multiply the received downlink chirp sensing waveform signal by the first reference signal to obtain an intermediate signal, a partial compression unit configured to partially compress the intermediate signal to, thereby, obtain a further intermediate signal, wherein the partial compression unit is further configured to change the first chirping coefficient to a second chirping coefficient, a delaying unit configured to delay the further intermediate signal by a deferment delay to obtain a delayed further intermediate signal, a chirp cloning unit configured to process the delayed further intermediate signal to obtain a cloned signal and a second multiplier configured to multiply the cloned signal by the second reference signal to obtain an uplink cloned chirp sensing waveform signal and a transmit antenna configured to transmit the uplink cloned chirp sensing waveform signal.

BRIEF DESCRIPTION OF THE DRAWINGS

For a more complete understanding of the present embodiments, and the advantages thereof, reference is now made, by way of example, to the following descriptions taken in conjunction with the accompanying drawings, in which:

FIG. 7A illustrates a plot featuring two loop frequencies in the frequency domain;

FIG. 7B illustrates a plot featuring a first spectrum and a second spectrum;

DETAILED DESCRIPTION OF ILLUSTRATIVE EMBODIMENTS

Figure 1:
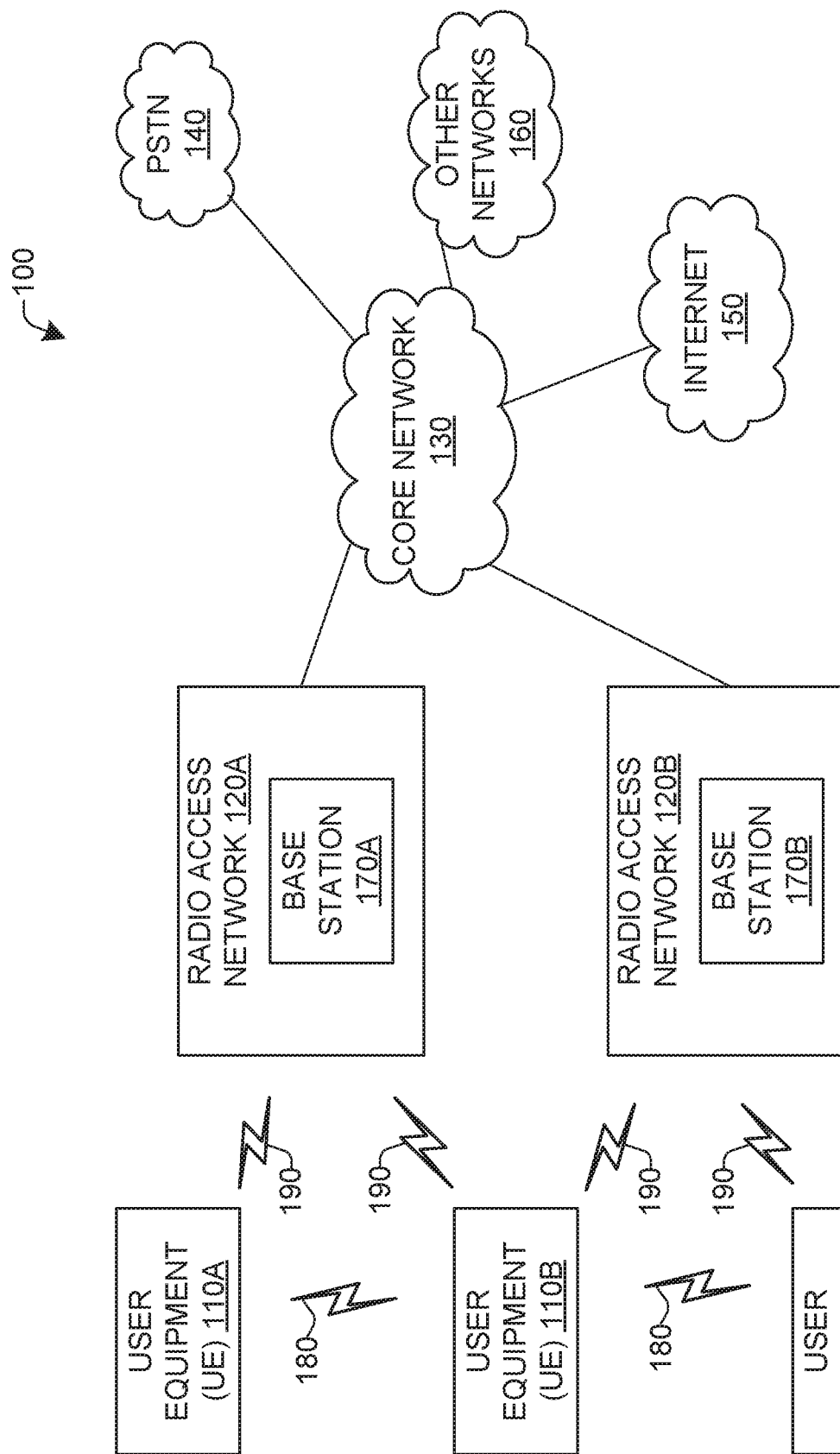
FIG. 1 is a schematic diagram of a communication system in which embodiments of the disclosure may occur, the communication system includes an example user equipment and an example base station.

For illustrative purposes, specific example embodiments will now be explained in greater detail in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include, or otherwise have access to, a non-transitory computer/processor readable storage medium or media for storage of information, such as computer/processor readable instructions, data structures, program modules and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e., DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto.

Computer/processor readable/executable instructions to implement an application or module described herein may be stored or otherwise held by such non-transitory computer/processor readable storage media.

Ideally, a positioning system that can accurately determine respective positions of a plurality of UEs is a system that is fine-tuned and capable in every aspect. It may be understood that any single source of impairment contributes to overall error in location estimation. Example sources of impairment include hardware design, software design, waveform characteristics and wireless channel characteristic estimation. It may be understood that precision position determination is a problem of a difficult nature, since precision position determination can employ inter-disciplinary expertise; that is, precision position determination can employ expertise in a wide variety of disjoint areas.

Cellular-based position determination is associated with a set of challenges that are not present in GPS-based position determination. These challenges include challenges related to synchronization, challenges related to bandwidth limitation, challenges related to severe multipath, and challenges related to a frequent lack of line-of-sight (LoS) access to a cell tower. Aside from the challenges related to bandwidth limitation, which may be considered to be a problem for both GPS-based position determination approaches and cellular-based position determination approaches, the rest of the aforementioned challenges may be considered to be much more problematic for a cellular-based position determination approach than for a GPS-based position determination approach.

Known GPS-based position determination approaches and known cellular-based position determination approaches may be characterized as employing an "active" positioning paradigm. In an active positioning paradigm, the enquirer of position information (i.e., the UE) takes part in process of determining the position of the enquirer. The enquirer may transmit or receive (or both) a signal specific to position determination process.

The bandwidth limitation is generally considered to be a problem of active position determination systems due to the distinct capabilities at each end of a position determination link. The performance of a position determination process may be considered to be upper-bounded by a least capable device. The least capable device for a typical position determination link is the UE.

Radar systems may be considered to be capable of accurately detecting and localizing targets (missiles, bombers, fighter jets, etc.) as both ends of the position determination link are devices that are capable of sending and receiving wideband signals. To distinguish between the paradigm that forms the basis for position determination in radar systems and the paradigm that forms the basis for position determination in active position determination systems, the paradigm by which radar systems determine position may be called a "passive" position determination paradigm. In a passive position determination paradigm, the target is oblivious to the position determination process. In the use-case for which radar systems were conceived (i.e., intrusion detection), the target being unaware of the position determination process may be just as important as determination of the position of the target.

Notably, for radar, the passive position determination process may be in aid of solving a binary-decision problem. That is, upon determining positions for a plurality of targets, the task becomes a task of distinguishing friend targets from foe targets. When a trajectory of friend targets is known, there is little, if any, ambiguity in the task of distinguishing a friend target from a foe target. Even when there are numerous foe targets, the objective is not necessarily to localize each and every foe target; the objective is more likely to be related to removing the foe targets from the environment.

In the application of a passive position determination technique to a terrestrial setting, one objective is to distinctly determine a position for every UE in the network. Unfortunately, conventional passive position determination techniques introduce ambiguity to position determination. The ambiguity induces a position determination error known as association error.

One characteristic of airborne radar, which is an example of passive position determination, is that echoes from the targets are orders of magnitude larger than echoes attributable to atmospheric scattering. In contrast, when a passive position determination process is applied to a terrestrial setting, the echoes reflected from the UEs are not necessarily the strongest echoes, due to the presence of large clutter (buildings, trees, etc.) and ground reflections. This clutter induces a position determination error known as clutter-swamping error.

Clutter-swamping error can be minimized when a map of the environment is precisely known. However, the problem of precisely determining a map for an environment may be an even more difficult problem to solve than the problem of UE position determination. Yet even more challenging is the problem of correctly associating observations received from UEs of similar characteristics to the identities of each of those UEs.

Aspects of the present application relate to a solution to the UE position determination problem. By being at the boundary between an active approach and a passive approach, aspects of the present application borrow strengths of the active UE position determination paradigm and strengths of the passive UE position determination paradigm, while minimizing shortcomings of both paradigms.

Aspects of the present application tackle the problem of precision position determination of devices by, in part, providing the devices with a capability for receiving, manipulating and retransmitting a sensing signal to an extent that allows for position determination to be accomplished at the source of the sensing signal.

According to aspects of the present application, a UE receives a sensing waveform, manipulates the sensing waveform to arrive at a manipulated sensing waveform and then transmits the manipulated sensing waveform. Advantageously, the manipulation is accomplished without needing to carry out operations associated with conventional signal processing of a conventional reference signal used for pose estimation. Therefore, the term "looping" has been coined herein for this simplified process. By limiting the amount of intra-UE processing steps, it may be shown that the sensing waveform is not as contaminated by time uncertainties and/or frequency uncertainties as the sensing waveforms in full-fledged active position determination systems.

FIG. 1 illustrates, in a schematic diagram, an example communication system 100. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate efficiently by sharing resources, such as bandwidth.

In this example, the communication system 100 includes a first user equipment (UE) 110A, a second UE 110B and a third UE 110C (individually or collectively 110), a first radio access network (RAN) 120A and a second RAN 120B (individually or collectively 120), a core network 130, a public switched telephone network (PSTN) 140, the Internet 150 and other networks 160. Although certain numbers of these components or elements are shown in FIG. 1, any reasonable number of these components or elements may be included in the communication system 100.

The UEs 110 are configured to operate, communicate, or both, in the communication system 100. For example, the UEs 110 are configured to transmit, receive, or both via wireless communication channels. Each UE 110 represents any suitable end user device for wireless operation and may include such devices (or may be referred to) as a wireless transmit/receive unit (WTRU), a mobile station, a mobile subscriber unit, a cellular telephone, a station (STA), a machine-type communication device (MTC), an Internet of Things (IoT) device, a personal digital assistant (PDA), a smartphone, a laptop, a computer, a touchpad, a wireless sensor or a consumer electronics device.

In FIG. 1, the first RAN 120A includes a first base station 170A and the second RAN includes a second base station 170B (individually or collectively 170). The base station 170 may also be called an anchor or a transmit point (TP). Each base station 170 is configured to wirelessly interface with one or more of the UEs 110 to enable access to any other base station 170, the core network 130, the PSTN 140, the internet 150 and/or the other networks 160. For example, the base stations 170 may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP) or a wireless router. Any UE 110 may alternatively or additionally be configured to interface, access or communicate with any other base station 170, the internet 150, the core network 130, the PSTN 140, the other networks 160 or any combination of the preceding. The communication system 100 may include RANs, such as the RAN 120B, wherein the corresponding base station 170B accesses the core network 130 via the internet 150, as shown.

The UEs 110 and the base stations 170 are examples of communication equipment that can be configured to implement some or all of the functionality and/or embodiments described herein. In the embodiment shown in FIG. 1, the first base station 170A forms part of the first RAN 120A, which may include other base stations (not shown), base station controller(s) (BSC, not shown), radio network controller(s) (RNC, not shown), relay nodes (not shown), elements (not shown) and/or devices (not shown). Any base station 170 may be a single element, as shown, or multiple elements, distributed in the corresponding RAN 120, or otherwise. Also, the second base station 170B forms part of the second RAN 120B, which may include other base stations, elements and/or devices. Each base station 170 transmits and/or receives wireless signals within a particular geographic region or area, sometimes referred to as a "cell" or "coverage area." A cell may be further divided into cell sectors and a base station 170 may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RANs 120 shown is exemplary only. Any number of RANs may be contemplated when devising the communication system 100.

The base stations 170 communicate with one or more of the UEs 110 over one or more air interfaces 190 using wireless communication links, e.g., radio frequency (RF) wireless communication links, microwave wireless communication links, infrared (IR) wireless communication links, visible light (VL) communications links, etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA) or single-carrier FDMA (SC-FDMA) in the air interfaces 190.

A base station 170 may implement Universal Mobile Telecommunication System (UMTS) Terrestrial Radio Access (UTRA) to establish the air interface 180 using wideband CDMA (WCDMA). In doing so, the base station 170 may implement protocols such as High Speed Packet Access (HSPA), Evolved HPSA (HSPA+) optionally including High Speed Downlink Packet Access (HSDPA), High Speed Packet Uplink Access (HSUPA) or both. Alternatively, a base station 170 may establish the air interface 180 with Evolved UTMS Terrestrial Radio Access (E-UTRA) using LTE, LTE-A, LTE-B and/or 5G New Radio (NR). It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE and GERAN. Of course, other multiple access schemes and wireless protocols may be utilized.

The RANs 120 are in communication with the core network 130 to provide the UEs 110 with various services such as voice communication services, data communication services and other communication services. The RANs 120 and/or the core network 130 may be in direct or indirect communication with one or more other RANs (not shown), which may or may not be directly served by the core network 130 and may or may not employ the same radio access technology as the first RAN 120A, the second RAN 120B or both. The core network 130 may also serve as a gateway access between (i) the RANs 120 or the UEs 110 or both, and (ii) other networks (such as the PSTN 140, the Internet 150 and the other networks 160).

The UEs 110 may communicate with one another over one or more sidelink (SL) air interfaces 180 using wireless communication links, e.g., radio frequency (RF) wireless communication links, microwave wireless communication links, infrared (IR) wireless communication links, visible light (VL) communications links, etc. The SL air interfaces 180 may utilize any suitable radio access technology and may be substantially similar to the air interfaces 180 over which the UEs 110 communicate with one or more of the base stations 170 or they may be substantially different. For example, the communication system 100 may implement one or more channel access methods, such as CDMA, TDMA, FDMA, OFDMA or SC-FDMA in the SL air interfaces 180. In some embodiments, the SL air interfaces 180 may be, at least in part, implemented over unlicensed spectrum.

Some or all of the UEs 110 may include functionality for communicating with different wireless networks over different wireless links using different wireless technologies and/or protocols. Instead of wireless communication (or in addition thereto), the UEs 110 may communicate via wired communication channels to a service provider or a switch (not shown) and to the Internet 150. The PSTN 140 may include circuit switched telephone networks for providing plain old telephone service (POTS). The Internet 150 may include a network of computers and subnets (intranets) or both and incorporate protocols, such as internet protocol (IP), transmission control protocol (TCP) and user datagram protocol (UDP). The UEs 110 may be multimode devices capable of operation according to multiple radio access technologies and incorporate multiple transceivers necessary to support multiple radio access technologies.

Figure 2:
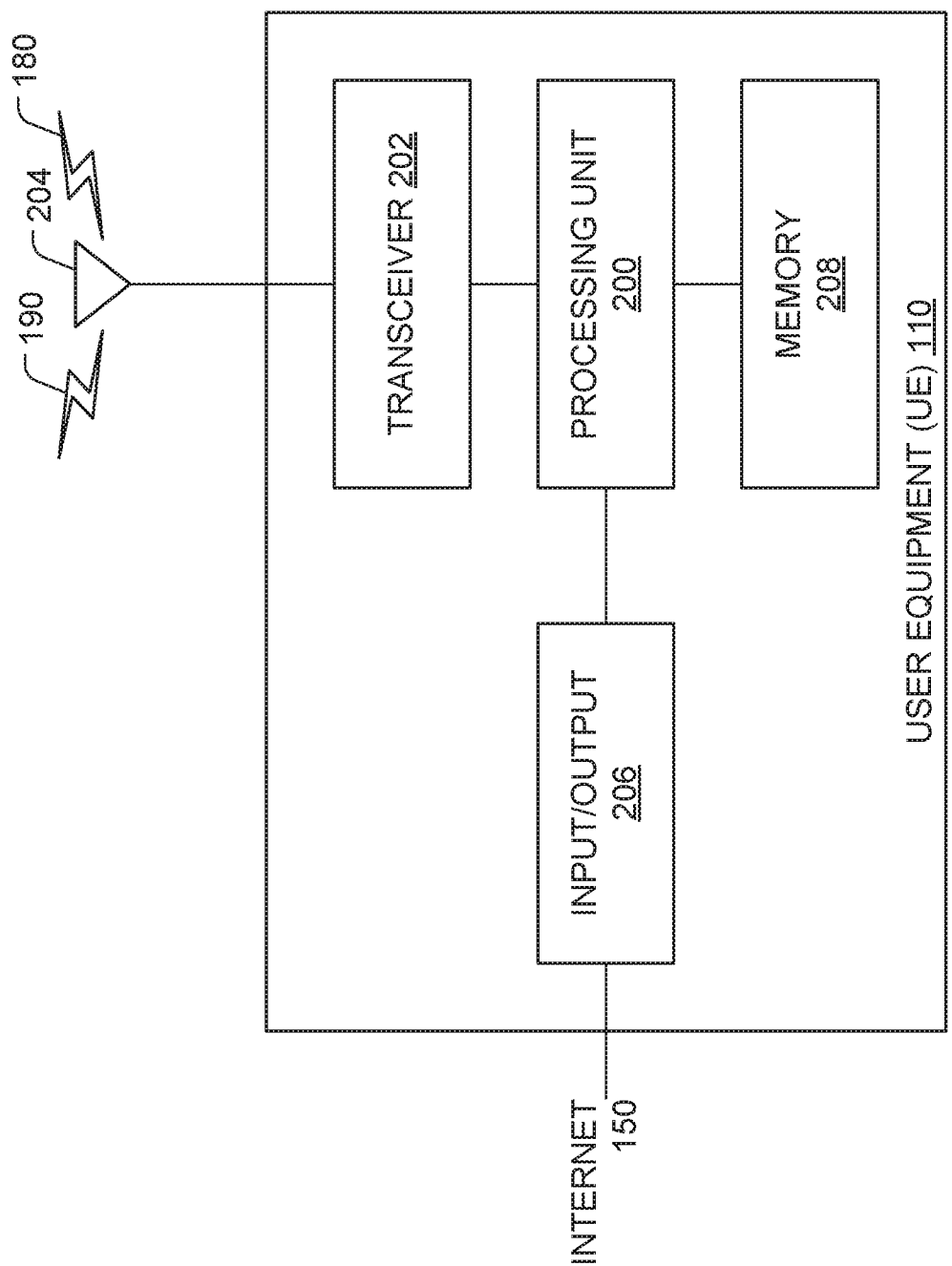
FIG. 2 illustrates, in a block diagram, an example user equipment of the communication system of FIG. 1, in accordance with aspects of the present application.
Figure 3:
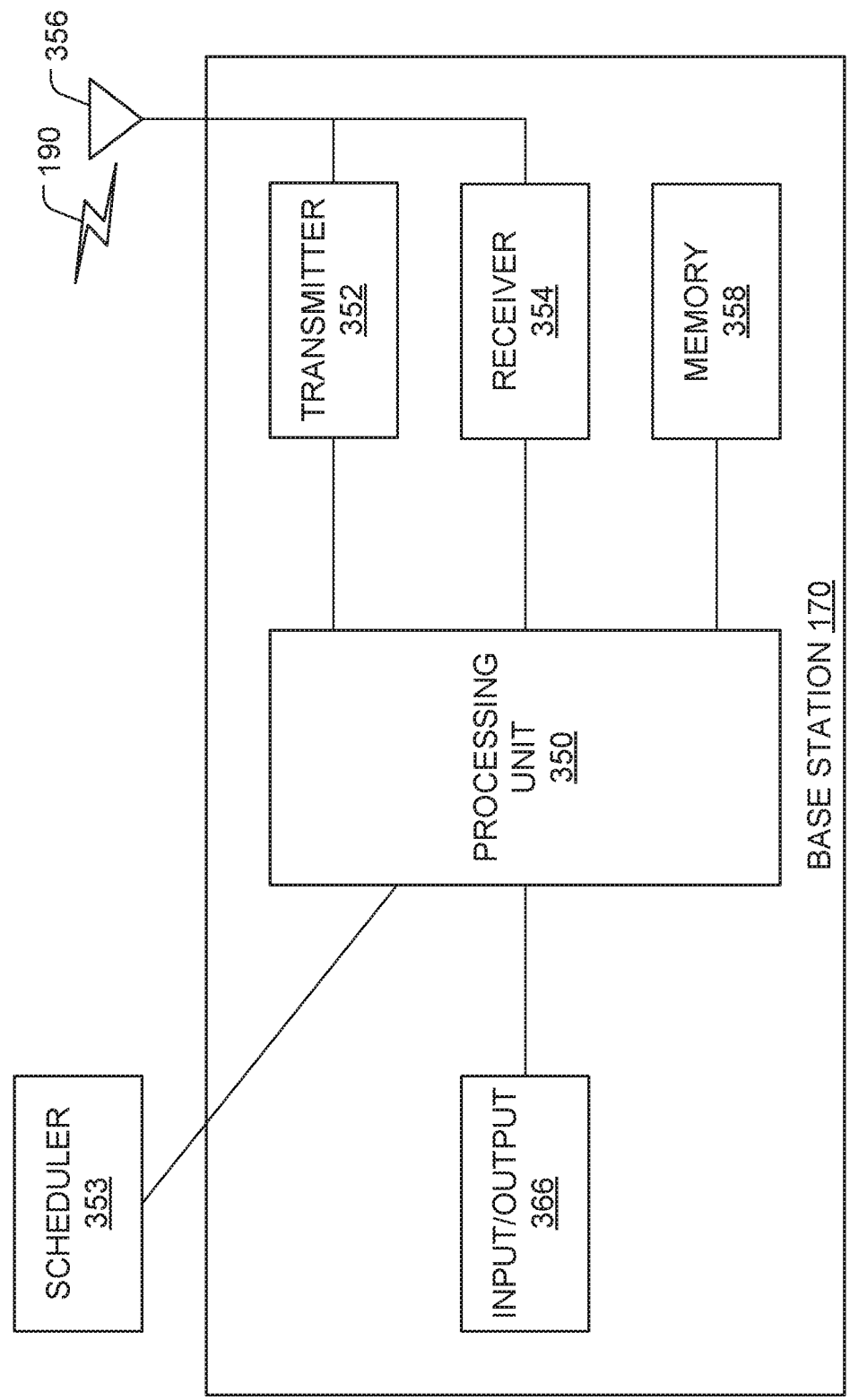
FIG. 3 illustrates, in a block diagram, an example base station of the communication system of FIG. 1, in accordance with aspects of the present application.

FIGS. 2 and 3 illustrate example devices that may implement the methods and teachings according to this disclosure. In particular, FIG. 2 illustrates an example UE 110 and FIG. 3 illustrates an example base station 170. These components could be used in the communication system 100 of FIG. 1 or in any other suitable system.

As shown in FIG. 2, the UE 110 includes at least one processing unit 200. The processing unit 200 implements various processing operations of the UE 110. For example, the processing unit 200 could perform signal coding, data processing, power control, input/output processing, or any other functionality enabling the UE 110 to operate in the communication system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the UE 110. One or multiple antennas 204 could be used in the ED 110. Although shown as a single functional unit, a transceiver 202 could also be implemented using at least one transmitter and at least one separate receiver.

The UE 110 further includes one or more input/output devices 206 or interfaces (such as a wired interface to the Internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the UE 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, the base station 170 includes at least one processing unit 350, at least one transmitter 352, at least one receiver 354, one or more antennas 356, at least one memory 358, and one or more input/output devices or interfaces 366. A transceiver, not shown, may be used instead of the transmitter 352 and receiver 354. A scheduler 353 may be coupled to the processing unit 350. The scheduler 353 may be included within or operated separately from the base station 170. The processing unit 350 implements various processing operations of the base station 170, such as signal coding, data processing, power control, input/output processing, or any other functionality. The processing unit 350 can also be configured to implement some or all of the functionality and/or embodiments described in more detail above. Each processing unit 350 includes any suitable processing or computing device configured to perform one or more operations. Each processing unit 350 could, for example, include a microprocessor, microcontroller, digital signal processor, field programmable gate array, or application specific integrated circuit.

Each transmitter 352 includes any suitable structure for generating signals for wireless or wired transmission to one or more UEs or other devices. Each receiver 354 includes any suitable structure for processing signals received wirelessly or by wire from one or more UEs or other devices. Although shown as separate components, at least one transmitter 352 and at least one receiver 354 could be combined into a transceiver. Each antenna 356 includes any suitable structure for transmitting and/or receiving wireless or wired signals. Although a common antenna 356 is shown here as being coupled to both the transmitter 352 and the receiver 354, one or more antennas 356 could be coupled to the transmitter(s) 352, and one or more separate antennas 356 could be coupled to the receiver(s) 354. Each memory 358 includes any suitable volatile and/or non-volatile storage and retrieval device(s) such as those described above in connection to the UE 110. The memory 358 stores instructions and data used, generated, or collected by the base station 170. For example, the memory 358 could store software instructions or modules configured to implement some or all of the functionality and/or embodiments described above and that are executed by the processing unit(s) 350.

Each input/output device 366 permits interaction with a user or other devices in the network. Each input/output device 366 includes any suitable structure for providing information to or receiving/providing information from a user, including network interface communications.

The term RADAR is formed from letters in the phrase Radio Azimuth Direction and Ranging. However, the term RADAR need not always be expressed in all caps; "RADAR," "Radar" and "radar" are equally valid. Radar is typically used for detecting a presence and a location of an object. A system using one type of radar, called "pulsed radar," radiates a pulse of energy and receives echoes of the pulse from one or more targets. The system determines the pose of a given target based on the echoes returned from the given target. A system using another type of radar, called "pulse-compression radar," uses the same amount of energy as is used in the pulsed radar system. However, in the pulse-compression radar system, the energy is spread in time and in frequency to reduce the instantaneous radiated power.

Given that radar systems are often used for space-borne applications, a free-space channel model (i.e., a model that is free of impairments such as multipath propagation and shadowing) may be used to approximate the operation of the radar system. It follows that, in a free-space channel model, a radar system may radiate a pulse with enough power that the received echoes have a power sufficient for the task of estimating characteristics of moving targets. Such characteristics may include, for example, velocity and location.

In terrestrial applications, multipath propagation and shadowing are dominant impairments. Since these impairments degrade the echo, pose estimation is rendered difficult. Mobile device users and vehicles are known to have insignificant Radar Cross Sections (RCSs). Consequently, weak echoes from mobile device users and vehicles cannot be recovered/detected with noisy commercial radar receivers, especially, in the presence of stronger echoes received from clutter with more significant RCSs.

Another challenge with using radar systems for terrestrial applications, as opposed to air-borne applications, is the problem of identifiability. In air-borne applications, the moving targets, such as airplanes, fighter jets and missiles, have distinct attributes, thereby making the targets distinguishable from each other only based on the return echoes of the pulses. For instance, a civilian aircraft has a larger radar cross section than a fighter jet. Additionally, the civilian aircraft generally travels at a lower speed and with less maneuverability than the fighter jet. Furthermore, missiles generally travel at a velocity three times the velocity of the fastest airplanes.

A terrestrial radar system may be given the task of determining a location for each UE 110 among hundreds of UEs 110 within a cell. The echoes from the UEs 110, assuming a detectable strength, do not, generally, allow for distinctions between the UEs 110. The objective of an air-borne radar system may be considered to be binary, in that the target may either be a friend or a foe. In contrast, a terrestrial radar system given the task of determining a location for many UEs 110 may be considered to have an objective that may be classed as a multi-hypothesis testing problem.

From a different perspective, target identifiability can be cast as a problem of associating specific observations to specific targets. Such an association problem is inherent to any passive remote sensing system, of which radar is one.

The impediments to pose estimation include system complexity and non-cooperativeness. Non-cooperativeness relates to the traditional intent of radar systems, that is, to sense targets that are non-cooperative in nature, such as: a missile; a car travelling faster than a speed limit; a celestial object; or a fighter jet. When the targets are active, meaning, the targets are capable of receiving and responding to the radar signal and the targets are willing to cooperate, the problem of identifiability may be solved according to embodiments of the present disclosure. For instance, UEs 110 in a cellular network may be obliged to cooperate with elements of the cellular network or may be obliged to follow some guidelines that have been established for the cellular network. Unfortunately, while active pose estimation benefits from cooperativeness, active pose estimation suffers from system complexity.

The system complexity impediment to pose estimation includes problems as diverse as those problems related to synchronization and those problems related to limited spectral/spatial resolution of the targets. One synchronization problem can be expressed as the problem of the receiving end of the sensing signal not precisely knowing time and frequency references of the transmitting end. Notably, in a mono-static radar setting, both the transmitting node and the receiving node are run by the same clock, the time references are inherently the same. Even in a bi-static setting or a multi-static setting, where a transmitter of a sensing signal and a receiver of the sensing signal are not co-located, the problem of synchronization can be solved through frequent and accurate clock calibrations. Such calibrations are realizable by high-speed and low-latency backhaul links between the transmitter and the receiver. Achieving perfect synchronization between UEs 110 and a network entity with which the UEs 110 are to synchronize may be recognized as a challenging problem.

Error factors in known Radio Frequency (RF) based positioning systems (passive and active) include: resolution error; synchronization error; association error; non-line-of-sight (NLoS) signal degradation; and signal-to-noise ratio (SNR) degradation.

Clock synchronization, between the UE 110 and the BS 170, and limited capabilities for each UE 110 are notable issues that hinder the achievement of centimeter-level position determination using positioning subsystems within current cellular systems. Resolving these two issues may be seen as steps toward achieving sub-meter position determination accuracy. Notably, sub-meter position determination accuracy is expected to be a feature of the next generation of cellular systems.

The issue of clock synchronization may be resolved through the use of radar systems for determining positioning of UEs 110. Position determination using radar systems may be shown not to suffer from imperfect synchronization for two main reasons: (1) radar systems utilize clocks that are highly stable to adversarial systematic and environmental effects; (2) the transmission, reception and processing often happen at the same anchor node and with reference to a single timer and oscillator.

Figure 4:
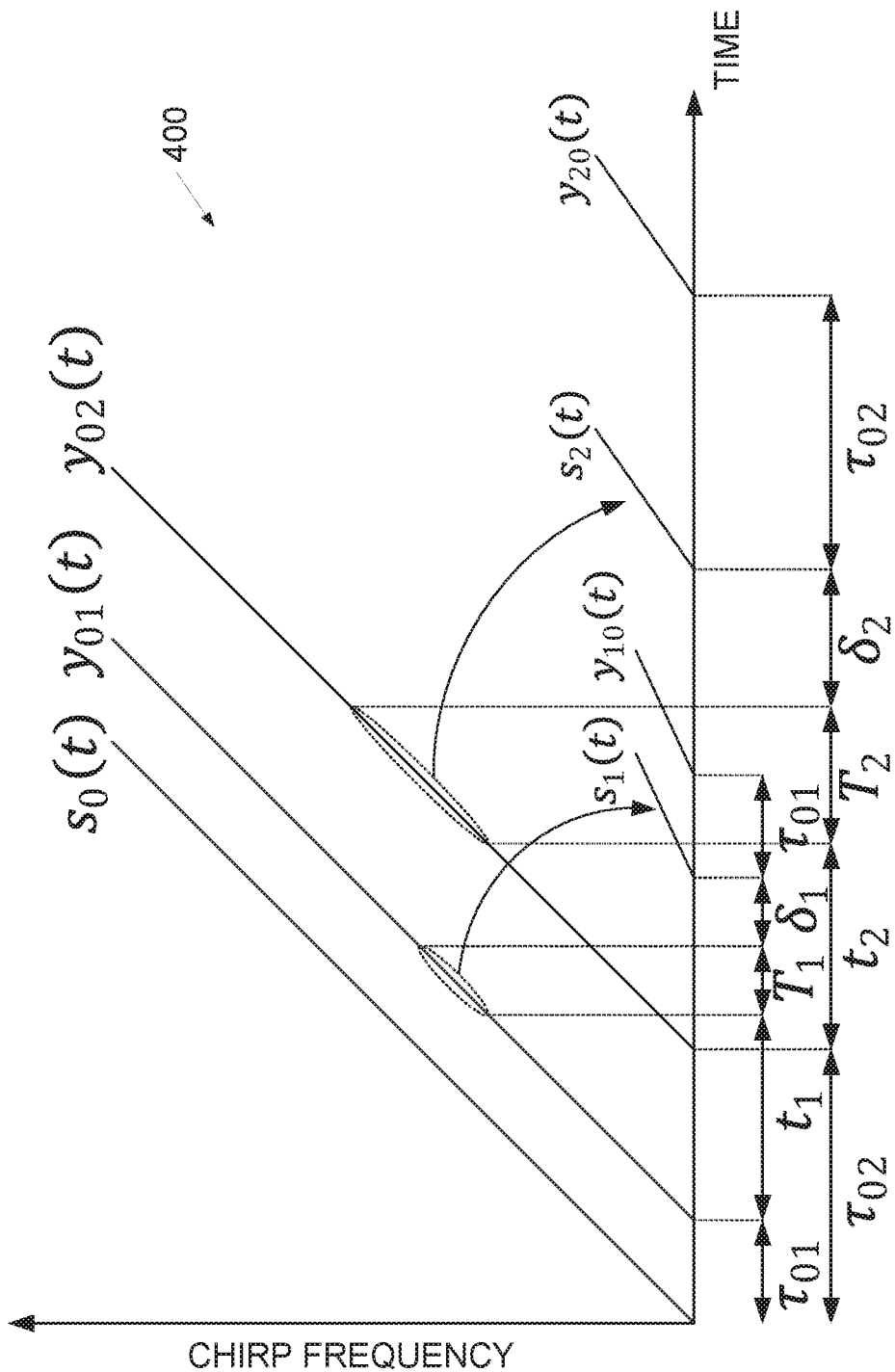
FIG. 4 illustrates a time-frequency plot of a type that is commonly used when analyzing a chirp waveform.

FIG. 4 illustrates a time-frequency plot 400 of a type that is commonly used when analyzing a chirp waveform. At the beginning of the time axis, the BS 170 transmits a downlink chirp sensing waveform ("DL-CSW") signal, which is represented as $s_0(t)$. A first received signal, a received version of the DL-CSW signal, $s_0(t)$, at the first UE 110A, is represented as $y_{01}(t)$. A second received signal, a received version of the DL-CSW signal, $s_0(t)$, at the second UE 110B, is represented as $y_{02}(t)$.

Since there is an assumption, in this example, that reception of the DL-CSW signal occurs over a wireless channel with only a single propagation path, also known as a free-space model, the received signal at each UE 110A, 110B is a shifted and attenuated version of $s_0(t)$ with the amount of shift being proportional to the distance between the BS 170 and the respective UE 110A, 110B. In a known approach, once a UE 110 receives a version, $y_{01}(t)$, of the DL-CSW signal, $s_0(t)$, the UE 110 may estimate the distance between the BS 170 and the UE 110. However, this approach, which is classically known as one-way ranging, has some fundamental deficiencies. The first deficiency is related to a clock at the UE 110 running at a different rate and bias compared to a clock at the BS 170. In this case, one-way ranging at the UE 110 results in erroneous estimates of the distance between the BS 170 and the UE 110. The second deficiency is related to limited capabilities at the UE 110, sampling the received signal inherently occurs at a sampling rate that cannot exceed the sampling rate capability of the UE 110. It follows that the sampling rate capability of the UE 110 limits the accuracy of the estimate of the distance between the BS 170 and the UE 110. Accordingly, it may be seen as advantageous to assign to the BS 170 the task of estimating the distance between the BS 170 and the UE 110.

In a case wherein the UEs 110 are objects that each have a large radar cross section (RCS) and the UEs 110 are the only objects in the environment, it follows that the BS 170 can effectively process CSW signal echoes backscattered from the UEs 110. By processing the echoes, the BS 170 may estimate a time, called a "round trip time" (RTT), that the CSW signal spent travelling to the UEs 110 and back to the BS 170.

Unfortunately, this approach suffers from shortcomings. Unless the BS 170 has a priori knowledge of the approximate location of each UE 110, has a priori knowledge of the reflectivity of each UE 110 and has a priori knowledge of the RCS characteristics of each UE 110, the BS 170 cannot be expected to accurately associate a specific RTT estimate to a specific UE 110. Furthermore, if two UEs 110 fall within the same ranging gate (i.e., inside a disk whose width is less than a ranging resolution of the BS 170), it may be considered to be impossible for the BS 170 to resolve between the echoes backscattered from those UEs 110. At this point, it may be seen as useful to depart from the free-space assumption to, momentarily, focus on a multipath setting. In a multipath setting, a multiplicity of CSW signal echoes are received at the BS 170, owing to CSW signal interactions with clutter in the environment. It is highly possible, in such a setting, that a direct path CSW signal echo from a UE 110 will be swamped by CSW signal echoes reflected from the clutter. Clearly, the simple approach of processing, at the BS 170, backscattered CSW signal echoes is not a suitable approach for use in multi-agent and multi-path environments.

In overview, according to aspects of the present application, the UE 110 clips part of the received DL-CSW signal and transmits the clipped version of the CSW signal back to the BS 170. The process of clipping part of the DL-CSW signal may also be called a cloning process. When carrying out the cloning process, the $j^{th}$ UE 110j follows directives. The directives relate to reception parameters and transmission parameters. The directives may be advertised to the UE 110j before the start of the transmission, by the BS 170, of the DL-CSW signal, $s_0(t)$. These parameters may include (but are not limited to) a gating delay, $t_j$, a deferment delay, $\delta_j$, a UE-specific cloning coefficient, $\alpha_j$, and a cloning duration, $T_j$. Factors that may influence selection of specific values for the parameters may include: a number of UEs 110 for which position determination is to be carried out at each round of DL-CSW signal transmission; a geographical spread of UEs 110 in the environment; internal capabilities of the UEs 110; and a degree of delay spread of the multi-path channel.

The time-frequency plot 400 of FIG. 4 includes a first UL cloned CSW signal, $y_{10}(t)$. The first UL cloned CSW signal, $y_{10}(t)$, has been cloned at the first UE 110A and subsequently received at the BS 170. The time-frequency plot 400 of FIG. 4 also includes a second UL cloned CSW signal, $y_{20}(t)$. The second UL cloned CSW signal, $y_{20}(t)$, has been cloned at the second UE 110B and subsequently received at the BS 170.

Through selection, at the BS 170, of each gating delay, $t_j$, and each deferment delay, $\delta_j$, the UL cloned CSW signals may be arranged to be resolvable at the BS 170. This property of resolvability allows the BS 170 to determine a particular UE 110 to which to associate each received UL cloned CSW signal. Moreover, only a minimal interaction, at the $j^{th}$ UE 110j, with the received version, $y_{0j}(t)$, of the DL-CSW signal, $s_0(t)$, enables the $j^{th}$ UE 110j to leave an implicit signature on the transmitted UL cloned CSW signal, $s_j(t)$, which is received, at the BS 170, as a received UL cloned CSW signal, $y_{j0}(t)$. The implicit signature provides the BS 170 with clues that allow the BS 170 to associate a specific received UL cloned CSW signal, $y_{j0}(t)$ with the $j^{th}$ UE 110j. Also, due to the fact that transmitter of the DL-CSW signal, $s_0(t)$, and the receiver of the UL cloned CSW signal, $y_{j0}(t)$, is a single node (i.e., the BS 170), there is only a single temporal reference and only a single spectral reference. This single-reference characteristic may be considered to be helpful in avoiding the temporal synchronization issues and/or spectral synchronization issues that are inherent in one-way ranging.

The time-frequency plot 400 of FIG. 4 illustrates receipt of the DL-CSW signal, $s_0(t)$, at the first UE 110A, as $y_{01}(t)$ after a first BS-UE propagation delay, $\tau_{01}$. The first UE 110A waits a gating delay, $t_1$, before cloning a portion of the received version, $y_{01}(t)$, of the DL-CSW signal. The portion has a cloning duration, $T_1$. The first UE 110A waits a deferment delay, $\delta_1$, before transmitting a processed signal, $s_1(t)$, based on the cloned portion of the received version, $y_{01}(t)$, of the DL-CSW signal. The BS 170 receives the received UL cloned signal, $y_{10}(t)$, after a first UE-BS propagation delay, $\tau_{01}$.

The time-frequency plot 400 of FIG. 4 illustrates receipt of the DL-CSW signal, $s_0(t)$, at the second UE 110B, as $y_{02}(t)$ after a second BS-UE propagation delay, $\tau_{02}$. The second UE 110B waits a gating delay, $t_2$, before cloning a portion of the received version, $y_{02}(t)$, of the DL-CSW signal. The portion has a cloning duration, $T_2$. The second UE 110B waits a deferment delay, $\delta_2$, before transmitting a processed signal, $s_2(t)$, based on the cloned portion of the received version, $y_{02}(t)$, of the DL-CSW signal. The BS 170 receives the received UL cloned signal, $y_{20}(t)$, after a second UE-BS propagation delay, $\tau_{02}$.

Figure 5:
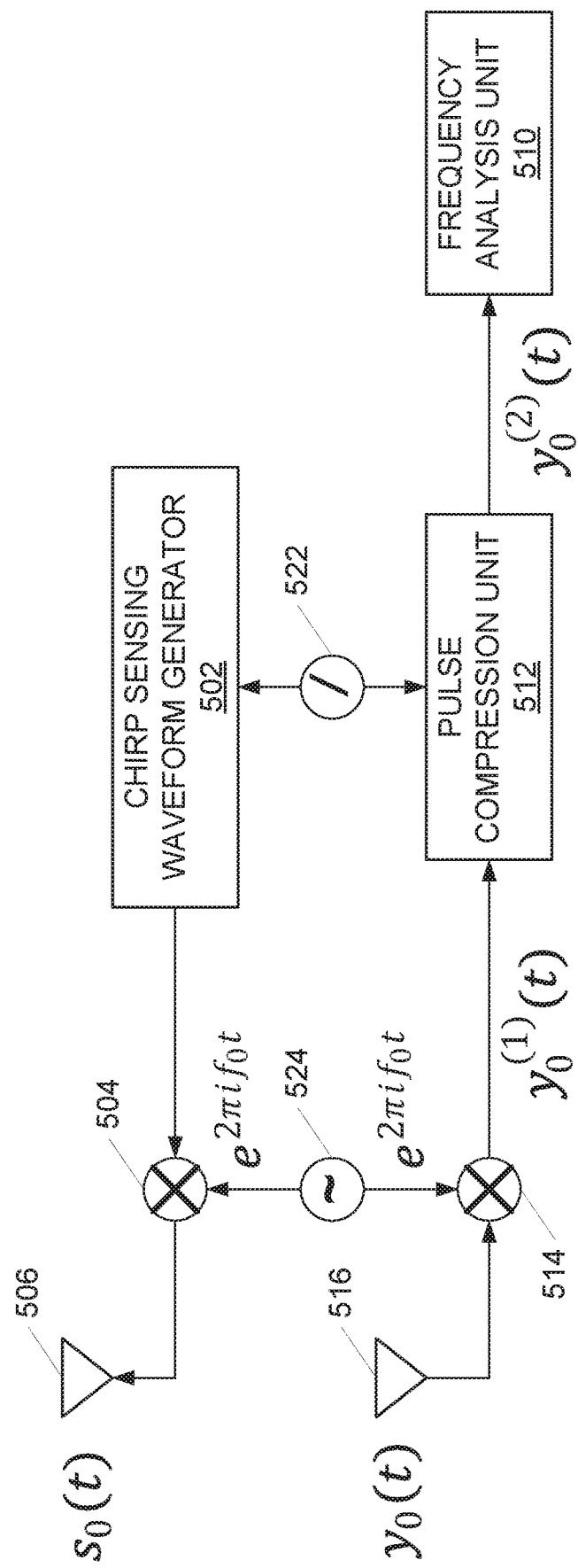
FIG. 5 illustrates, in a block diagram, components of an example base station of the communication system of FIG. 1, in accordance with aspects of the present application.

FIG. 5 illustrates components of the BS 170, which components are related to aspects of the present application. The BS 170 includes a CSW generator 502 and a BS oscillator 524. The BS oscillator 524 is tuned to a frequency of $f_0$. The CSW generator 502 is connected to a BS voltage-controlled oscillator or "frequency-modulated waveform generator" 522. Each of the CSW generator 502 and the BS oscillator 524 have output connected to a BS outbound multiplier 504. The output of the BS outbound multiplier 504 is fed to a BS transmit antenna 506. The BS 170 also includes a BS receive antenna 516 and a BS inbound multiplier 514. The BS inbound multiplier 514 is connected to the BS oscillator 524. The output of the BS inbound multiplier 514 is connected to a pulse compression unit 512. The output of the pulse compression unit 512, which is connected to the BS frequency-modulated waveform generator 522, is connected to a frequency analysis unit 510.

While the preceding and following embodiments describe a base station 170 transmitting a downlink CSW signal, these embodiments are only examples of a typical or preferred scenario. Since the CSW is preferably a wideband signal, the transmitter needs to have enough power and bandwidth to transmit the wideband signal. Such a transmitter would typically be located at a base station due to transmitter size, power consumption, thermal output, etc. However, in other embodiments, the transmitter may be located at another network device such as a relay or Location Management Function (LMF) or at a UE that is less constrained by transmitter size, power consumption, etc. Such a UE could, for example, be a UE-relay, a vehicle, etc. In implementations where the CSW transmitter is located at a UE, the CSW signal would be known as a sidelink (SL) CSW signal.

Figure 6:
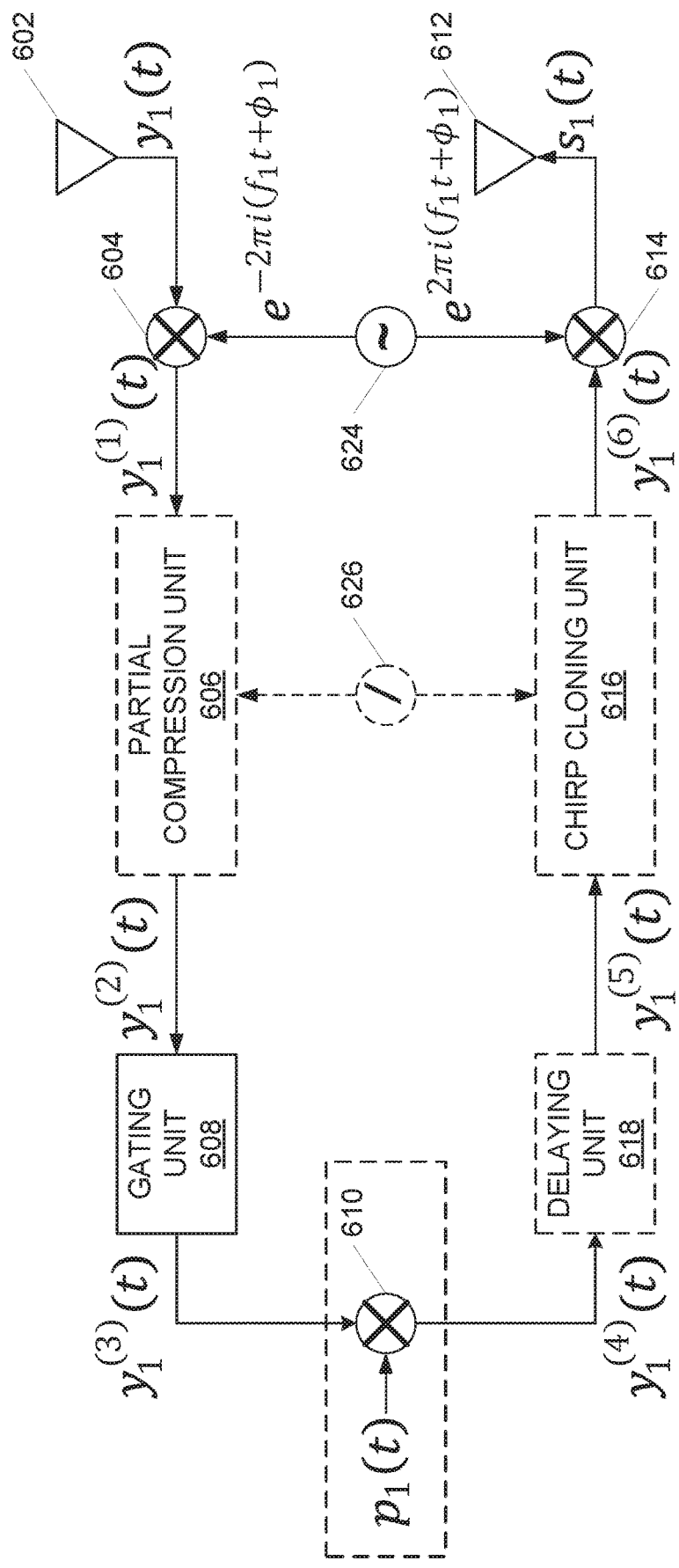
FIG. 6 illustrates, in a block diagram, components of an example user equipment of the communication system of FIG. 1, in accordance with aspects of the present application.

FIG. 6 illustrates components of a generic one of the UEs 110, which components are related to aspects of the present application. The UE 110 includes a UE oscillator 624. The UE oscillator 624 is tuned to generate a signal a frequency of $f_1$. The UE 110 also includes a UE receive antenna 602 for receiving a wireless signal. The UE receive antenna 602 and the UE oscillator 624 are connected to a UE inbound multiplier 604, which down-converts the RF ($f_1$) frequency signal to a baseband signal.

Output from the UE inbound multiplier 604 is optionally received at a partial compression unit 606. The partial compression unit 606 is connected to an optional UE voltage-controlled oscillator or "frequency-modulated waveform generator" 626, which generates a reference frequency-modulated waveform. The partial compression unit 606 modifies the received baseband signal with reference to the output of the frequency-modulated waveform generator 626. This modification of the signal by the partial compression unit can be uniquely associated with the UE. Output from the partial compression unit 606 is received at a gating unit 608.

The gating unit 608 "clips" a time-delayed portion of the received baseband signal or, optionally, the modified baseband signal. In implementations including the partial compression unit 606, the order of the gating unit 608 and the partial compression unit 606 may be reversed. That is, the received baseband signal may be first clipped and then subsequently modified according to the output of the frequency-modulated waveform generator 626.

The output of the gating unit 608 is based on a portion of the received chirp sensing waveform signal. Therefore, the frequency bandwidth of the gating unit 608 output signal is less than the frequency bandwidth of the received chirp sensing waveform signal. The parameters of the selected portion can be uniquely associated with the UE.

Output from the gating unit 608 is optionally received at a code multiplier 610. The optional code multiplier 610 also receives an orthogonalization code, $p_1(t)$ and applies said orthogonalization code to the clipped baseband signal. The orthogonalization code can be a device-specific code for providing an added degree of freedom to associate device identity with device pose estimation. Output from the code multiplier 610 is optionally received at a delaying unit 618, which adds an additional time delay (over the gating unit 608) in order to provide greater design or configuration freedom to associate device identity with device pose estimation. Both the orthogonalization code and the time delay can each be uniquely associated with the UE.

The output of the gating unit 608 (or of the partial compression unit 606, the code multiplier 610, or the delaying unit 618, as the case may be) is connected to a UE outbound multiplier 614. The UE outbound multiplier 614 also maintains a connection with the UE oscillator 624. The UE outbound multiplier 614 up-converts the clipped baseband signal to a clipped RF ($f_1$) frequency signal. Output from the UE outbound multiplier 614 is received at a UE transmit antenna 612.

Optionally, in implementations that include some amount of digital processing, the output from the gating unit 608 (or of the partial compression unit 606, the code multiplier 610, or the delaying unit 618, as the case may be) is received at a chirp cloning unit 616. The chirp cloning unit 616 is connected to the frequency-modulated waveform generator 626 and, based on the reference frequency-modulated waveform, generates a digital baseband signal according to the previous signal processing operations. Output from the chirp cloning unit 616 is received at a UE outbound multiplier 614.

Figure 8:
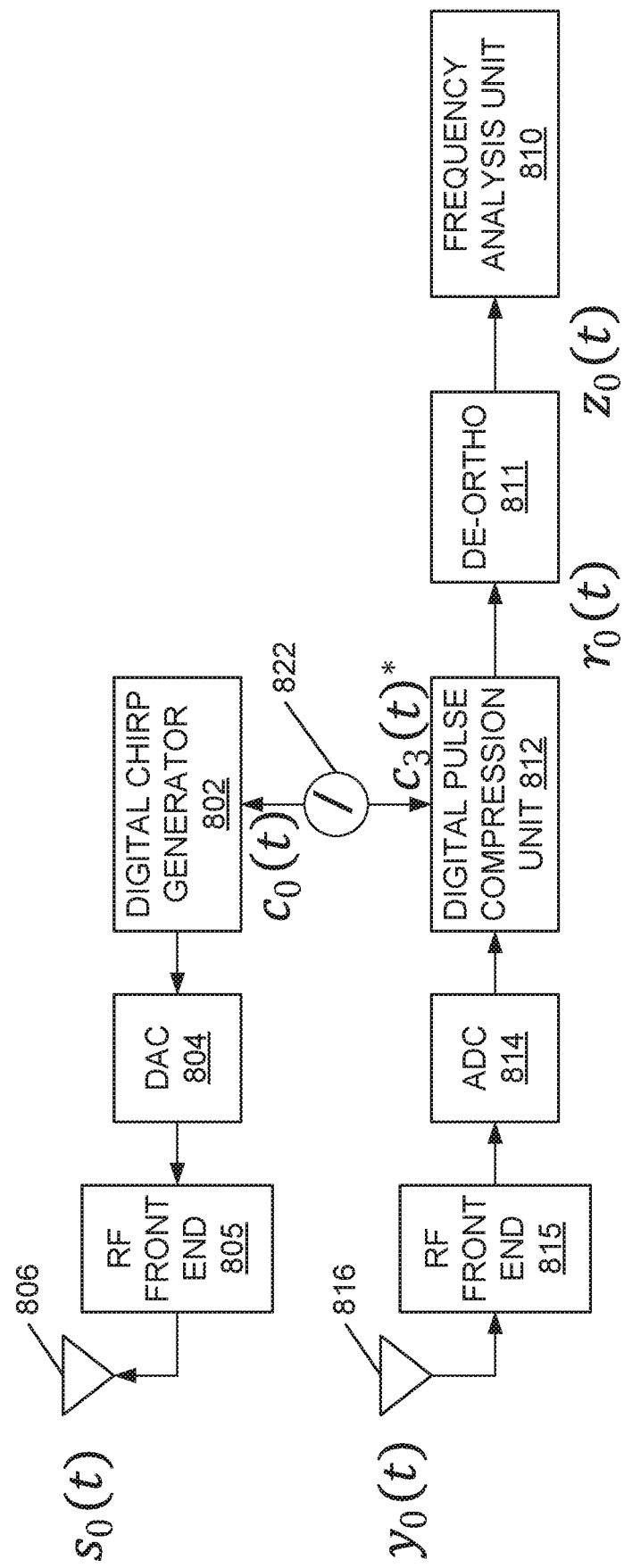
FIG. 8 illustrates, in a block diagram, components of an example base station of the communication system of FIG. 1 for a (partly) digital implementation, in accordance with aspects of the present application.

Whereas FIG. 5 illustrates components of the BS 170 for a general implementation suitable for both fully analog and partly digital implementations, FIG. 8 illustrates more specific components of the BS 170 that are needed for a partly digital implementation. The BS 170 includes a digital chirp generator 802. The digital chirp generator 802 can generate a digital chirp at the BS 170 using a signal received from a numerically-controlled oscillator 822. The output of the digital chirp generator 802 is received by a digital-to-analog converter (DAC) 804. The output of the DAC 804 is received by a BS outbound radio frequency (RF) front end 805. Output from the BS outbound RF front end 805 is fed to a BS transmit antenna 806. The BS 170 also includes a BS receive antenna 816. The output of the BS receive antenna 816 is received by a BS inbound RF front end 815. Output from the BS inbound RF front end 815 is received at an analog-to-digital converter (ADC) 814. The ADC 814 is connected to a digital pulse compression unit 812. The output of the digital pulse compression unit 812 is received at a de-orthogonalization unit 811. The output of the de-orthogonalization unit 811 is received by a frequency analysis unit 810.

Figure 9:
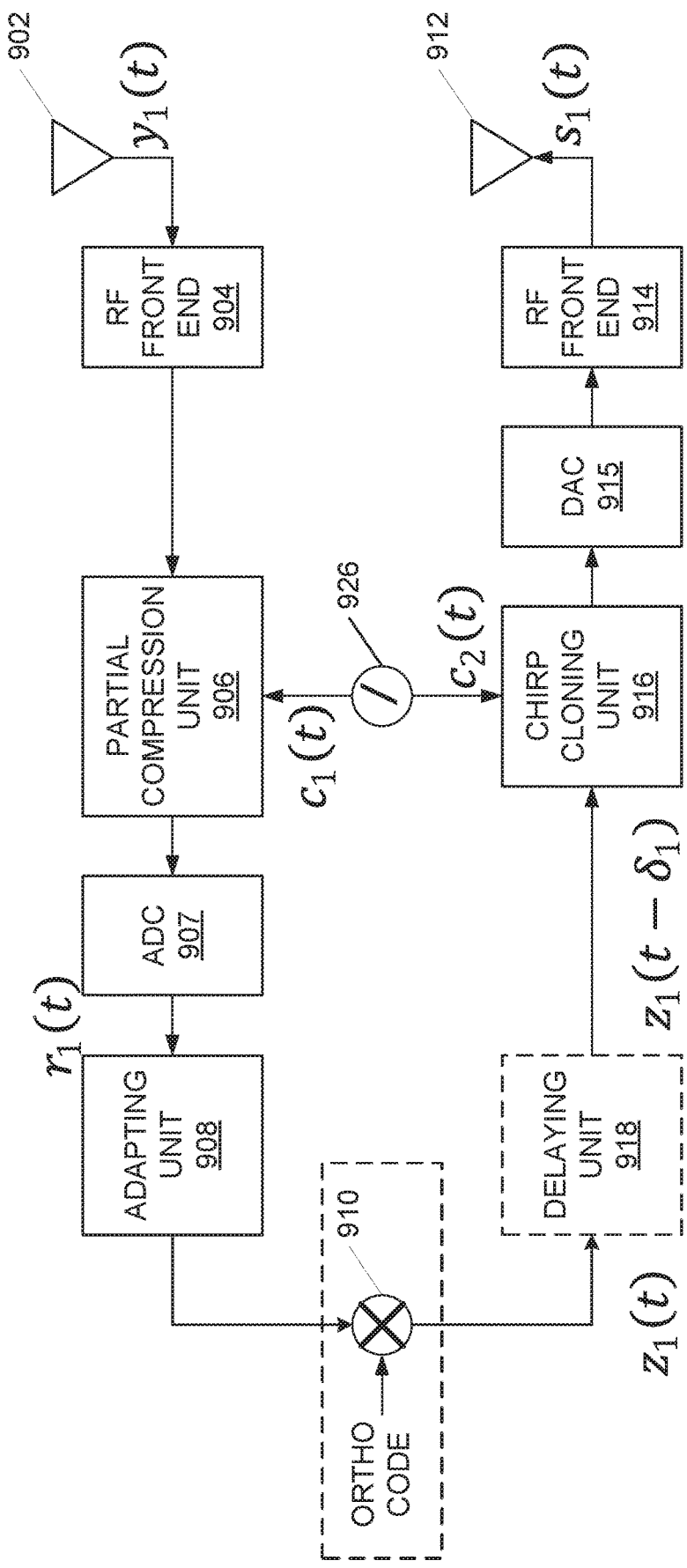
FIG. 9 illustrates, in a block diagram, components of an example user equipment of the communication system of FIG. 1 for a (partly) digital implementation, in accordance with aspects of the present application.

Whereas FIG. 6 illustrates components of the UE 110 for a general implementation suitable for both fully analog and partly digital implementations, FIG. 9 illustrates more specific components of the UE 110 that are needed for a partly digital implementation.

The UE 110 includes a UE receive antenna 902. Output from the UE receive antenna 902 is connected to a UE inbound RF front end 904. Output from the UE inbound RF front end 904 is received at a partial compression unit 906. The partial compression unit 906 is connected to a UE numerically-controlled oscillator 926. Output from the partial compression unit 906 is received at an ADC 907. Output from the ADC 907 is received at an adapting unit 908.

Output from the adapting unit 908 is optionally received at a code multiplier 910. The code multiplier 910 also receives an orthogonalization code. Output from the code multiplier 910 (or adapting unit 908, as the case may be) is optionally received at a delaying unit 918. Output from the delaying unit 918 (or adapting unit 908, or code multiplier 910, as the case may be) is received at a chirp cloning unit 916. The chirp cloning unit 916 is connected to the UE numerically-controlled oscillator 926. Output from the chirp cloning unit 916 is received at a DAC 915. Output from the DAC 915 is received at a UE outbound RF front end 914. Output from the UE outbound RF front end is received at a UE transmit antenna 912.

In operation, in view of FIGS. 5 and 6, the CSW generator 502 receives a BS reference chirp waveform from the BS frequency-modulated waveform generator 522. A signal, $$Ae^{2\pi i \frac{\alpha_0}{2} t^2},$$

at the output of the CSW generator 502 is multiplied, at the BS outbound multiplier 504, by the output, $e^{2\pi i f_0 t}$, of the BS oscillator 524 to result in the DL-CSW signal, $$s_0(t) = Ae^{2\pi i \left(f_0 t + \frac{\alpha_0}{2} t^2\right)},$$

$0 \le t < T_c$, where A is a DL-CSW signal amplitude, $f_0$ is the frequency to which the BS oscillator 524 is tuned, $T_c$ is a chirp period and $\alpha_0$ is a chirping coefficient (a.k.a. chirp rate). The DL-CSW signal, $s_0(t)$, is transmitted from the BS transmit antenna 506.

The channel between the BS 170 and the UE 110 introduces at least two changes to the transmitted DL-CSW signal, such that the received DL-CSW signal may be represented by signal that is received at the UE receive antenna 602, $y_1(t)=\beta_0 s_0(t-\tau_0)$, such that $$y_1(t) = A\beta_0 e^{2\pi i \left(f_0(t-\tau_0) + \frac{\alpha_0}{2}(t-\tau_0)^2\right)},$$

$\tau_0 \le t < T_c + \tau_0$, where $\beta_0$ is a channel attenuation coefficient and $\tau_0$ is a propagation delay.

The received DL-CSW, $y_1(t)$, that is received at the UE receive antenna 602 is multiplied, at the UE inbound multiplier 604, by a signal, $e^{-2\pi i (f_1 t + \phi_1)}$, output from the UE oscillator 624, where $f_1$ is the frequency to which the UE oscillator 624 is tuned and $\phi_1$ is a phase offset between the UE oscillator 624 and the BS oscillator 524. The output from the UE inbound multiplier 604 is a first intermediate signal, $$y_1^{(1)}(t) = A\beta_0 e^{2\pi i \left((f_0 - f_1 - \alpha_0 \tau_0)t + \frac{\alpha_0}{2} t^2 + \phi_1^{(1)}\right)},$$

$\tau_0 \le t < T_c + \tau_0$, where $$\phi_1^{(1)} = -f_0 \tau_0 + \frac{\alpha_0}{2} \tau_0^2 - \phi_1.$$

The first intermediate signal, $y_1^{(1)}(t)$, is optionally received by the partial compression unit 606. Since the first intermediate signal, $y_1^{(1)}(t)$, is a down-converted version of the DL-CSW, it may also be considered or referred to as a CSW, such as a baseband CSW.

The partial compression unit 606 uses the reference chirp waveform from the UE frequency-modulated waveform generator 626 to partially compress the first intermediate signal, $y_1^{(1)}(t)$, from the UE inbound multiplier 604 to, thereby, output a second intermediate signal $$y_1^{(2)}(t) = A\beta_0 e^{2\pi i \left((f_0 - f_1 - \alpha_0 \tau_0)t + \frac{\alpha_0 - \alpha_1}{2} t^2 + \phi_1^{(1)}\right)},$$

$\tau_0 \le t < T_c + \tau_0$, where $\alpha_1$ is the UE-specific cloning coefficient. The action of the partial compression unit 606 may be considered equivalent to changing the chirping coefficient from $\alpha_0$ to $(\alpha_0 - \alpha_1)$.

The gating unit 608 receives the first intermediate signal, $y_1^{(1)}(t)$, or the output, $y_1^{(2)}(t)$, of the partial compression unit 606 and uses a gating delay, $t_1$, to produce output $$y_1^{(3)}(t) = A\beta_0 e^{2\pi i \left((f_0 - f_1 - \alpha_0 \tau_0 - (\alpha_0 - \alpha_1) t_1)t + \frac{\alpha_0 - \alpha_1}{2} t^2 + \phi_1^{(2)}\right)} rect\left(\frac{t - t_1}{T_1}\right), \text{ where}$$

$$\phi_1^{(2)} = \phi_1^{(1)} + \frac{(\alpha_0 - \alpha_1)}{2} t_1^2 - (f_0 - f_1 - \alpha_0 \tau_0) t_1.$$

Recall that $T_1$ represents a cloning duration.

In implementations including the partial compression unit 606, the order of the gating unit 608 and the partial compression unit 606 may be reversed.

In an optional implementation with added orthogonality, the output, $y_1^{(3)}(t)$, of the gating unit 608 may be multiplied, at the code multiplier 610, by a UE-specific code, $p_1(t)$, to produce $y_1^{(4)}(t) = y_1^{(3)}(t) * p_1(t)$.

The optional delaying unit 618 delays the output, $y_1^{(4)}(t)$, of the code multiplier 610 by a deferment delay, $\delta_1$, to produce $$y_1^{(5)}(t) = A\beta_0 p_1(t - \delta_1) e^{2\pi i \left((f'' - (\alpha_0 - \alpha_1)\delta_1)t + \frac{\alpha_0 - \alpha_1}{2} t^2 + \phi_1^{(3)}\right)}, \text{ where}$$

$$f'' = f_0 - f_1 - \alpha_0 \tau_0 - (\alpha_0 - \alpha_1) t_1 \text{ and } \phi_1^{(3)} = \phi_1^{(2)} + \frac{\alpha_0 - \alpha_1}{2} \delta_1^2 - f'' \delta_1.$$

In an alternate implementation without orthogonality, the output, $y_1^{(3)}(t)$, of the gating unit 608 may be provided directly to the delaying unit 618, such that $y_1^{(4)}(t) = y_1^{(3)}(t)$. Such an implementation may be regarded as setting the orthogonalization code, $p_1(t) = 1$.

The optional chirp cloning unit 616 uses the output, $y_1^{(5)}(t)$, of the delaying unit 618 and the reference chirp waveform from the UE frequency-modulated waveform generator 626 to produce $$y_1^{(6)}(t) = AA'\beta_0 p_1(t - \delta_1) e^{2\pi i \left((f'' - (\alpha_0 - \alpha_1)\delta_1)t + \frac{\alpha_0}{2} t^2 + \phi_1^{(3)}\right)}.$$

The output, $y_1^{(6)}(t)$, of the chirp cloning unit 616 is multiplied, at the UE outbound multiplier 614, by a signal, $e^{2\pi i (f_1 t + \phi_1)}$, output from the UE oscillator 624. The output from the UE outbound multiplier 614 may be called a UL cloned CSW signal, $$s_1(t) = AA'\beta_0 p_1(t - \delta_1) e^{2\pi i \left((f'' - (\alpha_0 - \alpha_1)\delta_1 + f_1)t + \frac{\alpha_0}{2} t^2 + \phi_1^{(3)} + \phi_1\right)}.$$

The UL cloned CSW signal, $s_1(t)$, is transmitted from the UE transmit antenna 612.

The channel from the UE 110 to the BS 170 introduces at least two changes to the transmitted UL cloned CSW signal, such that the received UL cloned CSW signal, $y_0(t)$, may be represented by signal that is received at the BS receive antenna 516, $y_0(t) = \beta_0 s_1(t - \tau_0)$, where $\beta_0$ and $\tau_0$ are the channel attenuation coefficient and the propagation delay, respectively, familiar from the channel-introduced changes to the transmitted DL-CSW signal.

The received UL cloned CSW signal, $$y_0(t) = AA'\beta_0^2 p_1(t - \delta_1 - \tau_0) e^{2\pi i \left((f^{(3)} - \alpha_0 \tau_0)t + \frac{\alpha_0}{2} t^2 + \phi_1^{(4)}\right)}, \text{ where}$$

$$f^{(3)} = f'' - (\alpha_0 - \alpha_1)\delta_1 + f_1 \text{ and } \phi_1^{(4)} = \phi_1^{(3)} + \phi_1 - f^{(3)} \tau_0 + \frac{\alpha_0}{2} \tau_0^2,$$

is multiplied, at the BS inbound multiplier 514, by the output, $e^{2\pi i f_0 t}$, of the BS oscillator 524 to arrive at a signal, $y_0^{(1)}(t)$.

The combination of multiplication of the received UL cloned CSW signal, $y_0(t)$, by the output, $e^{2\pi i f_0 t}$, of the BS oscillator 524 (and a low pass filtering, which was eliminated here for the simplicity of exposition) and the use, by the pulse compression unit 512, of the reference chirp waveform from the BS frequency-modulated waveform generator 522, allows the pulse compression unit 512 to recreate the DL CSW signal, $s_0(t)$. The pulse compression unit 512 may combine the recreated DL CSW signal, $s_0(t)$ with knowledge of the UE-specific codes, $p_j(t)$, to generate a function, $h(t)=\Sigma_{j=1}^2(s_0(-t)p_j(-t))^*$, so that the pulse compression unit 512 and the frequency analysis unit 510 can be replaced by a matched filter that performs the operation, $y_0^{(2)}(t)=y_0^{(1)}(t)*h(t)$. Note that $(\bullet)^*$ is the complex conjugation operator.

The output from the pulse compression unit 512 is $$y_0^{(2)}(t) = y_0(t)e^{\left(-2\pi i\left(f_0 t + \frac{\alpha_0}{2}t^2\right)\right)}p_1^*(-t) = AA'\beta_0^2 e^{2\pi i\left(\left(f^{(3)}-\alpha_0\tau_0-f_0\right)t+\phi_1^{(4)}\right)}.$$

The output, $y_0^{(2)}(t)$, of the pulse compression unit 512 is received at the frequency analysis unit 510. At the frequency analysis unit 510, a frequency analysis is performed on the output, $y_0^{(2)}(t)$, of the pulse compression unit 512. The frequency analysis may, for example, involve a Fast Fourier Transform (FFT) analysis.

Notably, the frequency term, which may be called "$f^{loop}$", in the output, $y_0^{(2)}(t)$, of the pulse compression unit 512 is $f^{loop}=f^{(3)}-\alpha_0\tau_0-f_0$, which may be expanded based on $f^{(3)}=f''-(\alpha_0-\alpha_1)\delta_1+f_1$ to $f''-(\alpha_0-\alpha_1)\delta_1+f_1-\alpha_0\tau_0-f_0$, which may be expended based on $f''=f_0-f_1-\alpha_0\tau_0-(\alpha_0-\alpha_1)t_1$ to $f^{loop}=f_0-f_1-\alpha_0\tau_0-(\alpha_0-\alpha_1)t_1-(\alpha_0-\alpha_1)\delta_1+f_1-\alpha_0\tau_0-f_0$. By gathering like terms, it can be seen that the $f_0$ and $f_1$ terms cancel each other out and the remainder may be expressed as $f^{loop}=2\alpha_0\tau_0-(\alpha_0-\alpha_1)(\delta_1+t_1)$.

The result of the frequency analysis is a loop frequency, $f^{loop}=-2\alpha_0\tau_0-(\alpha_0-\alpha_1)(\delta_1+t_1)$. When there are multiple UEs 110, as illustrated in FIG. 1 and FIG. 4, the loop frequency associated with the $j^{th}$ UE 110$j$ may be represented by $f_j^{loop}=|2\alpha_0\tau_{0j}+(\alpha_0-\alpha_1)(\delta_j+t_j)|$.

The output, $y_0^{(2)}(t)$, of the pulse compression unit 512 may also be analyzed to obtain a loop phase, $\phi_1^{loop}=\phi_1^{(4)}$. Recall that $$\phi_1^{(4)} = \phi_1^{(3)} + \phi_1 - f^{(3)}\tau_0 + \frac{\alpha_0}{2}\tau_0^2.$$

This can be expanded using $$\phi_1^{(3)} = \phi_1^{(2)} + \frac{\alpha_0-\alpha_1}{2}\delta_1^2 - f''\delta_1 \text{ and } f^{(3)} = f'' - (\alpha_0-\alpha_1)\delta_1 + f_1.$$

Further expansion can be achieved using $$\phi_1^{(2)} = \phi_1^{(1)} + \frac{(\alpha_0-\alpha_1)}{2}t_1^2 - (f_0-f_1-\alpha_0\tau_0)t_1$$

and $f''=f_0-f_1-\alpha_0\tau_0-(\alpha_0-\alpha_1)t_1$. Altogether, the loop phase, $\phi_1^{loop}$, may be expanded as $$\phi_1^{loop} = -f_0\tau_0 + \frac{\alpha_0}{2}\tau_0^2 - \phi_1 + \frac{\alpha_0-\alpha_1}{2}t_1^2 - (f_0-f_1-\alpha_0\tau_0) +$$
$$\frac{\alpha_0-\alpha_1}{2}\delta_1^2 - (f_0-f_1-\alpha_0\tau_0-(\alpha_0-\alpha_1)t_1)\delta_1 + \phi_1 -$$
$$\frac{\alpha_0}{2}\tau_0^2 - (f_0-f_1-\alpha_0\tau_0-(\alpha_0-\alpha_1)t_1-(\alpha_0-\alpha_1)\delta_1+f_1)\tau_0.$$

The BS 170 may determine a difference between the loop phase at time $t=r_2$ and $t=r_1$ as $$\phi_1^{loop}(r_2)-\phi_1^{loop}(r_1)=(\tau_0(r_2)-\tau_0(r_1))((2\alpha_0-\alpha_1)(t_1+\delta_1)-2f_0).$$

The term $V^{\|}$ may be used to represent the speed of the UE 110 along the direction of propagation. Accordingly, $$\tau_0(r) = \frac{V^{\|} r}{c} \text{ and}$$

$$\phi_1^{loop}(r_2) - \phi_1^{loop}(r_1) = \left(\frac{V^{\|}(r_2-r_1)}{c}\right)((2\alpha_0-\alpha_1)(t_1+\delta_1)-2f_0).$$

The difference $(r_2-r_1)$ may be understood to represent an interspacing between two consecutive received UL cloned CSW signals and may be replaced by the term $T_p$, with the name chirp interspacing. When the equation for $\phi_1^{loop}(r_2)-\phi_1^{loop}(r_1)$ is rearranged to solve for $V^{\|}$, the equation may be expressed as $$V^{\|} = \frac{\phi_1^{loop}(r_2)-\phi_1^{loop}(r_1)}{T_p\left(\frac{(2\alpha_0-\alpha_1)(t_1+\delta_1)}{c}-\frac{2}{\lambda_0}\right)}.$$

It may be shown that a condition for unambiguous velocity estimation is $|\phi_1^{loop}(r_2)-\phi_1^{loop}(r_1)|<\frac{1}{2}$. Taking this condition into account, the maximum measurable velocity may be expressed as $$V^{\|} \leq \left|\frac{1}{2T_p\left(\frac{(2\alpha_0-\alpha_1)(t_1+\delta_1)}{c}-\frac{2}{\lambda_0}\right)}\right|.$$

Notably, the preceding equation illustrates that the maximum measurable velocity can change according to selections made, by the BS 170, of the gating delay, $t_1$, the deferment delay, $\delta_1$, the UE-specific cloning coefficient, $\alpha_1$, and the chirping coefficient, $\alpha_0$.

The BS 170 may estimate an angle to/from a UE 110 by processing the phase difference of the received UL cloned CSW signals and the reference clock.

The BS 170 may determine a difference between the loop phase, $\phi_1^{loop}$, of the same UL cloned CSW signal received at antennas in two locations in space, $s_1$ and $s_2$. The loop phase difference may be represented as $$\phi_1^{loop}(s_2)-\phi_1^{loop}(s_1)=(\tau_0(s_2)-\tau_0(s_1))\cdot((2\alpha_0-\alpha_1)(t_1+\delta_1)-2f_0)$$

Notably, it may be shown that $$\tau_0(s) = \tau_0(0) + \frac{s^{\|}}{c},$$

where $s^{\|}=s\cdot\sin\theta$ is representative of an extra distance that the UL cloned CSW signal has to travel beyond the $0^{th}$ antenna to reach the antenna at spatial position $s$. The term $\Delta\phi^{Loop}(s_2,s_1)$ can be defined as $\Delta\phi^{Loop}(s_2,s_1)=\phi_1^{loop}(s_2)-\phi_1^{loop}(s_1)$. It follows that $$\Delta\phi^{Loop}(s_2,s_1) = \frac{(s_2-s_1)\sin(\theta_0)}{c}\cdot((2\alpha_0-\alpha_1)(t_1+\delta_1)-2f_0).$$

Estimating the angle to/from the $j^{th}$ UE 110$j$ involves determining a phase change across the UL cloned CSW signal received at multiple antennas in space. More specifically, consider a term, $L_p$, to be the interspacing between two consecutive antennas in space, such that $L_p = s_2 - s_1$. Accordingly, the Angle-of-Arrival (AoA), $\theta_0$, may be expressed as $$\theta_0 = \sin^{-1}\left(\frac{\Delta\phi^{loop}(s_2, s_1)}{L_p\left(\frac{(2\alpha_0 - \alpha_1)(t_1 + \delta_1)}{c} - \frac{2}{\lambda_0}\right)}\right)$$

It may be shown that a condition for unambiguous angle estimation is that $|\Delta\phi^{loop}(s_2,s_1)| < \frac{1}{2}$. Taking this condition into account, the maximum measurable angle may be expressed as $$\theta_0 \leq \sin^{-1}\left(\left|\frac{1}{2L_p\left(\frac{(2\alpha_0 - \alpha_1)(t_1 + \delta_1)}{c} - \frac{2}{\lambda_0}\right)}\right|\right).$$

The expression for the maximum measurable angle may be rearranged to provide a maximum for the antenna interspacing, $L_p$, between two consecutive antennas as $$L_p \leq \left|\frac{1}{2\left(\frac{(2\alpha_0 - \alpha_1)(t_1 + \delta_1)}{c} - \frac{2}{\lambda_0}\right)}\right|$$

Typically, maximum interspacing between two consecutive antennas is $$\frac{\lambda_0}{4}.$$

The preceding equation illustrates that the antenna interspacing, $L_p$, between two consecutive antennas can change according to selections made, by the BS 170, of the gating delay, $t_1$, the deferment delay, $\delta_1$, the UE-specific cloning coefficient, $\alpha_1$, and the chirping coefficient, $\alpha_0$. Conveniently, the BS 170 may select parameters such that a maximum for the antenna interspacing, $L_p$, exceeds $$\frac{\lambda_0}{4}.$$

The approach described hereinbefore, wherein the pulse compression unit 512 implements a stretched processing may be considered to be a frequency-domain approach. Notably, as an alternative, a time-domain approach may be implemented by replacing the pulse compression unit 512 and the frequency analysis unit 510 with a matched filter. In view of FIG. 5, the combination of multiplication of the received UL cloned CSW signal, $y_0(t)$, by the output, $e^{2\pi i f_0 t}$, of the BS oscillator 524 and the use, of reference chirp waveform from the BS frequency-modulated waveform generator 522, allows the matched filter to recreate an output similar to the output that is generated at the output of the frequency analysis unit 510 in FIG. 5.

FIG. 7A illustrates a plot 700A featuring two loop frequencies, $f_1^{loop}$ and $f_2^{loop}$ in the frequency domain, thereby graphically illustrating that UL cloned CSW signals, $y_{10}(t)$ and $y_{20}(t)$ (see FIG. 4), received from two distinct UEs 110 may be distinguished at the BS 170 at the output of the frequency analysis unit 510. Contributing factors to the distinctness of the two loop frequencies include any one or more of: the UE-specific cloning coefficient, $\alpha_j$; the gating delay, $t_j$; and the deferment delay, $\delta_j$. These factors are known to the BS 170. Indeed, it is the BS 170 that provides, to each UE 110, at least one of the UE-specific cloning coefficient, $\alpha_j$, the UE-specific gating delay, $t_j$, and the UE-specific deferment delay, $\delta_j$. Accordingly, the BS 170 is able to implicitly distinguish UL cloned CSW signals received from distinct UEs 110. In addition to distinguishing UL cloned CSW signals received from distinct UEs 110, the knowledge of the UE-specific cloning coefficient, $\alpha_j$, the UE-specific gating delay, $t_j$, and the UE-specific deferment delay, $\delta_j$, allows the BS 170 to determine propagation delay, $$\tau_{0,j} = \frac{1}{2\alpha_0}\left|f_j^{loop} + (\alpha_0 - \alpha_j)(\delta_j + t_j)\right|.$$

Upon determining propagation delay, $\tau_{0,j}$, the BS 170 may determine a distance, that is, a range, $d_j$, between the BS 170 and the $j^{th}$ UE 110$j$, as $d_j = c\tau_{0,j}$.

There is a problem with the equation presented hereinbefore for $\tau_{0,j}$ in that there is no accounting for processing delay, $t_{UE}$, at the UE 110. It follows that a better equation may be expressed as $$\tau_{0j} = \frac{1}{2\alpha_0}\left|f_j^{loop} + (\alpha_0 - \alpha_j)(\delta_j + t_j + t_{UE})\right|.$$

The loop frequency associated with the first UE 110 (j=1) may be represented by $f_1^{loop} = |2\alpha_0\tau_{0,1} + (\alpha_0 - \alpha_1)(\delta_1 + t_1)|$. The loop frequency associated with the second UE 110 (j=2) may be represented by $f_2^{loop} = |2\alpha_0\tau_{0,2} + (\alpha_0 - \alpha_2)(\delta_2 + t_2)|$.

FIG. 7A is representative of the frequency-domain approach with the reference waveform received, at the output of the frequency analysis unit 510, from the BS frequency-modulated waveform generator 522.

FIG. 7B is representative of the time-domain approach, with the UE 110 processing a version of the DL CSW signal with the UE-specific code, $p_1(t)$, and with the pulse compression unit 512 implementing a matched filter and frequency analysis unit 510 removed.

FIG. 7B illustrates a plot 700B featuring the time-domain profile obtained at the output of the matched filter implementation. The profile is comprised of two main lobes corresponding to returns from two UEs. A first main lobe is centered at $\hat{\tau} = 2\tau_{01} + \delta_1 + t_1$ and a second main lobe is centered at $\hat{\tau}_2 = 2\tau_{02} + \delta_2 + t_2$. The peak of the first main lobe has the value of $\sqrt{\alpha_1 T_1^2}$ and the width of this first main lobe is $$\frac{1}{\alpha_1 T_1}.$$

The peak of the second main lobe is $\sqrt{\alpha_2 T_2^2}$ and the width of this second main lobe is $$\frac{1}{\alpha_2 T_2}.$$

Accordingly, the BS 170 is able to implicitly distinguish UL cloned CSW signals received from distinct UEs 110. In addition to distinguishing UL cloned CSW signals received from distinct UEs 110, the knowledge of the UE-specific cloning coefficient, $\alpha_j$, the UE-specific gating delay, $t_j$, and the UE-specific deferment delay, $\delta_j$, allows the BS 170 to determine propagation delay.

Upon determining propagation delay, $\tau_{0,j}$, the BS 170 may determine a distance, that is, a range, $d_j$, between the BS 170 and the $j^{th}$ UE 110$j$, as $d_j = c\tau_{0,j}$.

In general, the output, $y_0^{(2)}(t)$, of the pulse compression unit 512 may be described, in the time domain, as $$y_0^{(2)}(t) = \sum_{J=1}^{N_{UE}} A_0 A_j \beta_j^2 e^{2\pi i \left( f_j^{loop} t + \phi_j^{loop} \right)} rect_j(t)$$

where $$rect_j(t) = U(t - \min(T_C, T_j + t_j + \tau_{0,j})) - U(t - (t_j - \tau_{0,j}))$$

and where $U(\cdot)$ is the Heavyside function.

The output, $y_0^{(2)}(t)$, of the pulse compression unit 512 may be described, in the frequency domain, as $$y_0^{(2)}(f) = \sum_{J=1}^{N_{UE}} A_0 A_j \beta_j^2 e^{-2\pi i \psi_j}$$

$$\min(T_j, T_C - t_j - \tau_j) Sinc(\min(T_j, T_C - t_j - \tau_j) \cdot (f + f_j^{loop})).$$

It is notable, in the plot 700A in FIG. 7A, that the frequency spectrum of the signal, $y_{01}^{(2)}$, received from the first UE 110A overlaps, to some extent, with the frequency spectrum of the signal, $y_{02}^{(2)}$, received from the second UE 110B. Such overlapping is not preferred. Conveniently, the extent to which received signals, $y_{0j}^{(2)}$, overlap in the frequency domain is well within the control of the BS 170, through appropriate selection of looping parameters. Similar argument is true about the plot 700B in FIG. 7B which is the time-domain representation of the output of the matched filter. Indeed, when looping parameters are not selected appropriately, the received signal from one UE 110 can swamp the received signal from another UE 110.

A resolvability limit may be defined for each UE 110. The looping parameters may be selected so that the UL cloned CSW signal received from one UE 110 do not fall into the resolvability limit of UL cloned CSW signal received from another UE 110, and vice versa. In particular, the looping parameters may be selected so that $$2(\tau_{0,2} - \tau_{0,1}) + t_2 - t_1 + \delta_2 - \delta_1 > \max\left(\frac{1}{\alpha_1 T_1}, \frac{1}{\alpha_2 T_2}\right).$$

The UE-specific gating delay, $t_j$, and the UE-specific deferment delay, $\delta_j$, may be selected, by the BS 170, based on previously determined range estimates for each UE 110 or accordingly to some a priori knowledge that BS 170 might have about its range to UE 110. Alternatively, the selection, by the BS 170, of the UE-specific gating delay, $t_j$, and the UE-specific deferment delay, $\delta_j$, may be randomized. To have an aliased-free range estimate, the sampling rate $R_j$ applied to a signal will have to be at least equal to twice the bandwidth of the signal, that is $R_j \geq 2B_j = 2(\alpha_j T_j)$ According to aspects of the present application, the parameters $R_j$, $\alpha_j$ and $T_j$ should be selected, by the BS 170, such that the Nyquist sampling rate requirement is satisfied Furthermore, according to aspects of the present application, the UE-specific cloning coefficient, $\alpha_j$, should be selected, by the BS 170, based on those capabilities of the UE 110$j$ that are known to the BS 170. Notably, the selection of the UE-specific cloning coefficient, $\alpha_j$, will influence a value for a compression gain, $g_j$, which value may be determined as $g_j = \alpha_j T_j^2$. The BS 170 may select the cloning duration, $T_j$, according to positioning requirements and transmit power constraints at the UE 110. Notably, a larger $T_j$ may be shown to yield a signal-to-noise ratio (SNR) gain and a consequential decrease in variance for range estimation. However, as noted hereinbefore, the cloning duration, $T_j$, is also a factor in the bandwidth, $B_j$, of the UL cloned CSW signal and is a factor in the compression gain, $g_j$.

In another aspect of the present application, the BS 170 is able to explicitly distinguish UL cloned CSW signals received from distinct UEs 110. FIG. 5 illustrates components used by an example BS 170 to transmit a CSW, $s_0(t)$, and to process a received UL cloned CSW signal, $y_0(t)$. FIG. 6 illustrates components used by an example UE 110 to process the received DL-CSW, $y_1(t)$, and to transmit a UL cloned CSW signal, $s_1(t)$. The signal processing, at the UE 110, includes clipping, partial compression and cloning to arrive at the UL cloned CSW signal, $s_1(t)$. In a further embodiment, FIG. 8 illustrates components used by an example BS 170 to transmit a CSW, $s_0(t)$, and to process a received UL cloned CSW signal, $y_0(t)$, in the digital domain. FIG. 9 illustrates components used by an example UE 110 to process the received DL-CSW, $y_1(t)$, in the digital domain and to transmit a UL cloned CSW signal, $s_1(t)$. The digital domain processing, at the UE 110 in FIG. 9, includes sampling, processing and reconstructing.

In operation, the digital chirp generator 802 receives a discrete-time, discrete-valued representation of a BS reference chirp waveform, $c_0(t)$, from the BS numerically-controlled oscillator 822. A digital chirp signal, at the output of the digital chirp generator 802, is converted to an analog chirp signal by the DAC 804. The analog chirp signal at the output of the DAC 804 is prepared for transmission by the BS outbound RF front end 805. After preparation, the DL-CSW signal, $s_0(t)$, is transmitted from the BS transmit antenna 806. The preparation for transmission that is carried out by the BS outbound RF front end 805 may include up-conversion, as carried out by the combination of the BS outbound multiplier 504 and the BS oscillator 524 in FIG. 5. The preparation for transmission that is carried out by the BS outbound RF front end 805 may also include other functions, such as low noise amplification and filtering.

The received DL-CSW, $y_1(t)$, that is received at the UE receive antenna 902 is prepared, at the UE inbound RF front end 904. The preparation upon reception that is carried out by the UE inbound RF front end 904 may include down-conversion, as carried out by the combination of the UE inbound multiplier 604 and the UE oscillator 624 in FIG. 6. The UE inbound RF front end 904 may also perform such functions as low noise amplification and filtering. The output from the UE inbound RF front end 904 is received by the partial compression unit 906. The partial compression unit 906 uses a UE reference chirp waveform, $c_1(t)$, from the UE numerically-controlled oscillator 926 to partially compress the output of the inbound RF front end 904. The action of the partial compression unit 906 may be considered equivalent to changing the chirping coefficient from $\alpha_0$ to $(\alpha_0 - \alpha_1)$. Instead of partial compression, the action of the unit 906 may include adding a gating delay. In either case, the action of the unit 906 may be understood to establish that the signal output from the unit 906 satisfies the Nyquist criterion.

The output of the partial compression unit 906 may be digitized by the ADC 907. The digital output, $r_1(t)$, of the ADC 907, upon receipt at the adapting unit 908, may be subject to digital windowing or digital filtering, with a goal of adapting the signal to the capabilities of the UE 110. The output of the adapting unit 908 is optionally multiplied, at the code multiplier 910, by a UE-specific orthogonalization code to produce an orthogonalized signal, $z_1(t)$. Conveniently, the UE-specific orthogonalization code provides code-domain orthogonalization for the UL cloned CSW signal transmitted by each UE 110 among a plurality of UEs 110.

The optional delaying unit 918 delays the orthogonalized signal, $z_1(t)$, at the output of the code multiplier 910 by a UE-specific deferment delay, $\delta_1$, to produce a delayed orthogonalized signal, $z_1(t-\delta_1)$. Conveniently, the UE-specific deferment delay provides time-domain orthogonalization for the UL cloned CSW signal transmitted by each UE 110 among a plurality of UEs 110.

The chirp cloning unit 916 uses the delayed orthogonalized signal, $z_1(t-\delta_1)$, from the delaying unit 918 and a reference chirp waveform, $c_2(t)$, from the UE numerically-controlled oscillator 926 to produce a digital UL cloned CSW signal.

The digital UL cloned CSW signal output from the chirp cloning unit 916 may then be converted to an analog UL cloned CSW signal by the DAC 915. The analog UL cloned CSW signal is prepared, at the UE outbound RF front end 914 and then the prepared UL cloned CSW signal, $s_1(t)$, is transmitted from the UE transmit antenna 912. The preparation of the analog UL cloned CSW signal at the UE outbound RF front end 914 may include up-conversion, as carried out by the combination of the UE outbound multiplier 614 and the UE oscillator 624 in FIG. 6. The preparation for transmission that is carried out by the UE outbound RF front end 914 may also include other functions, such as low noise amplification and filtering.

A received UL cloned CSW signal, $y_0(t)$, is received at the BS receive antenna 816. The received UL cloned CSW signal is prepared by the BS inbound RF front end 815 and then digitized by the ADC 814. The preparation upon reception that is carried out by the BS inbound RF front end 815 may include down-conversion, as carried out by the combination of the BS inbound multiplier 514 and the BS oscillator 524 in FIG. 5. The BS inbound RF front end 815 may also perform such functions as low noise amplification and filtering.

The output from the ADC 814 is received by the digital pulse compression unit 812. The digital pulse compression unit 812 uses a reference chirp waveform, $c_3(t)^*$, from the BS numerically-controlled oscillator 822 to compress the output from the ADC 814. The digital pulse compression unit 812 may use matched filtering or stretch processing to compress the output from the ADC 814. The output, $r_0(t)$, of the digital pulse compression unit 812 is received at the de-orthogonalization unit 811. The de-orthogonalization unit 811 may subject the output, $r_0(t)$, of the digital pulse compression unit 812 to UE-specific windowing and de-orthogonalization to arrive at a de-orthogonalized signal, $z_0(t)$. At the frequency analysis unit 810, a frequency analysis is performed on the de-orthogonalized signal, $z_0(t)$. The frequency analysis may, for example, involve a Fast Fourier Transform (FFT) analysis.

When aspects of the present application are implemented in the digital domain, as illustrated in FIGS. 8 and 9, some uncertainty results. The sampling frequency of the ADC 907 at the UE 110 is assumed not to be known at the BS 170.

Accordingly, the amount of time that the signal spends at the UE 110, that is, the time between the time at which the received DL-CSW, $y_1(t)$, is received at the UE receive antenna 902 and the time at which the prepared UL cloned CSW signal, $s_1(t)$, is transmitted from the UE transmit antenna 912, adds to the uncertainty of the range estimates that will be obtained at the BS 170 upon processing of the received UL cloned CSW signal, $y_0(t)$, that is received at the BS receive antenna 816. This uncertainty is proportional to a sampling frequency offset ("SFO" also known as clock skew, $\zeta_1$) between the UE 110 and BS 170, as well as the number of clock cycles elapsed at the UE 170 in the digital domain.

Figure 10:
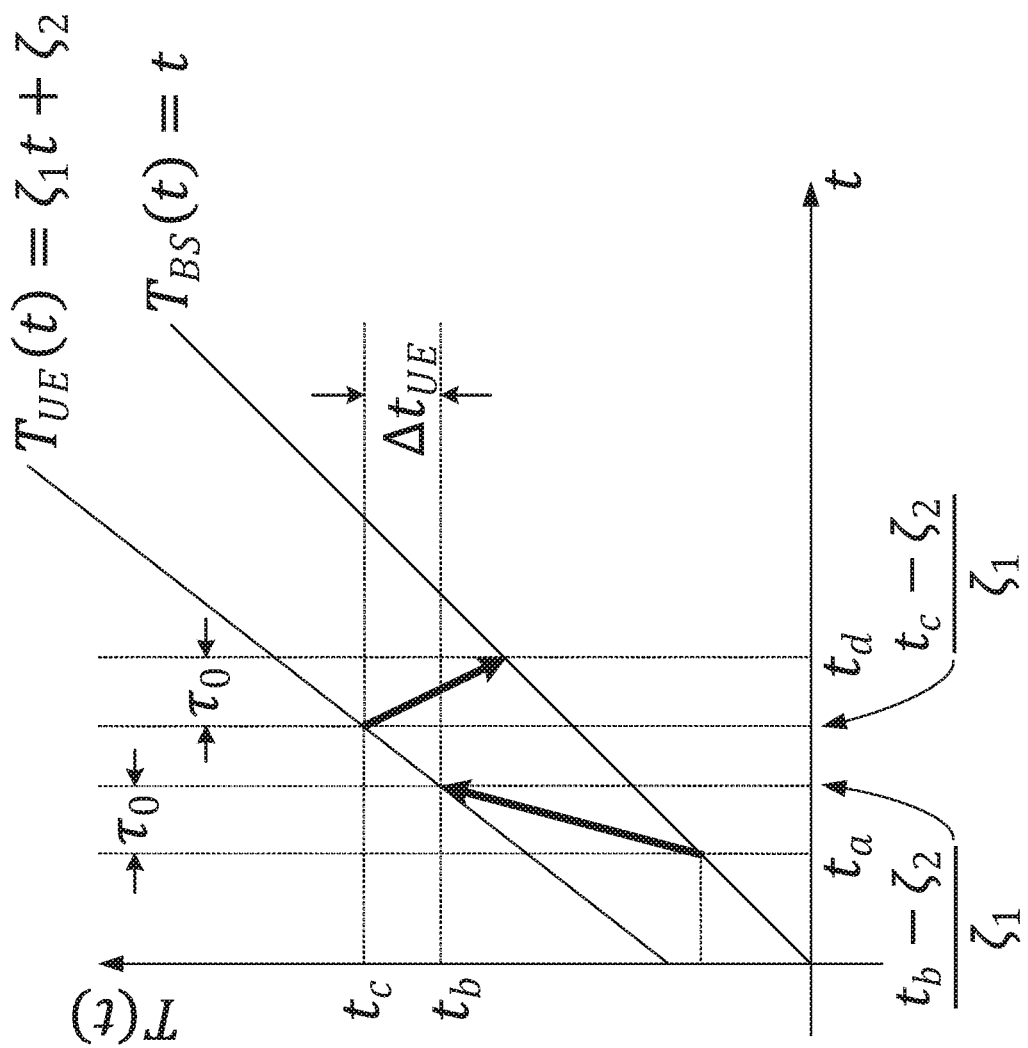
FIG. 10 illustrates a plot to illustrate an effect of mismatched clock between transmitter and receiver.

FIG. 10 illustrates a plot to illustrate an effect of mismatched clock between transmitter and receiver. The plot illustrated in FIG. 10 includes a first line, $T_{BS}(t)$, representative of a base station 170 time frame and a second line, $T_{UE}(t)$, representative of a user equipment 110 time frame. The first line is described by a first function, $T_{BS}(t)=t$. The second line is described by second function, $T_{UE}(t)=\zeta_1 t+\zeta_2$, where $\zeta_1$ represents UE clock skew, also known as SFO, and $\zeta_2$ represents UE clock bias.

A DL-CSW signal, $s_0(t)$, transmitted from the BS transmit antenna 806 at a time $t_a$ arrives at the UE 110 at a time $t_b$, where $$\frac{t_b - \zeta_2}{\zeta_1} = t_a + \tau_0$$

and $\tau_0$ is a one-way propagation delay. The UE 110 receives the DL-CSW, $y_1(t)$, processes the DL-CSW, $y_1(t)$, and transmits, at time $t_c$, the prepared UL cloned CSW signal, $s_1(t)$, to the base station 170. The prepared UL cloned CSW signal, $s_1(t)$, arrives at the BS 170, as the UL cloned CSW signal, $y_0(t)$, at a time $$t_d = \frac{t_c - \zeta_2}{\zeta_1} + \tau_0.$$

The BS 170 may determine a CSW round trip time ("RTT"=$2\tau_0$). Determining the RTT at the BS 170 involves obtaining a difference between the time the DL-CSW signal, $s_0(t)$, was transmitted (time $t_a$) and the time the UL cloned CSW signal, $y_0(t)$, was received (time $t_d$). That is, $$RTT = t_d - t_a$$
$$= \frac{t_c - \zeta_2}{\zeta_1} + \tau_0 - \left(\frac{t_b - \zeta_2}{\zeta_1} - \tau_0\right)$$
$$= 2\tau_0 + \frac{t_c}{\zeta_1} - \frac{t_b}{\zeta_1}$$
$$= 2\tau_0 + \frac{\delta_1 + \Delta t_{UE}}{\zeta_1}.$$

The term $$\frac{\delta_1 + \Delta t_{UE}}{\zeta_1}$$

may be considered to be an error term that represents a difference between the value $2\tau_0$ and value for a RTT measured at a BS 170. The error term is jointly caused by the gating delay, $\delta_1$, the UE processing time, $\Delta t_{UE}$, and sampling frequency offset, $\zeta_1$. Provided that $\zeta_1$ is never known perfectly, the error term may not be satisfactorily determined at the BS 170.

Figure 11:
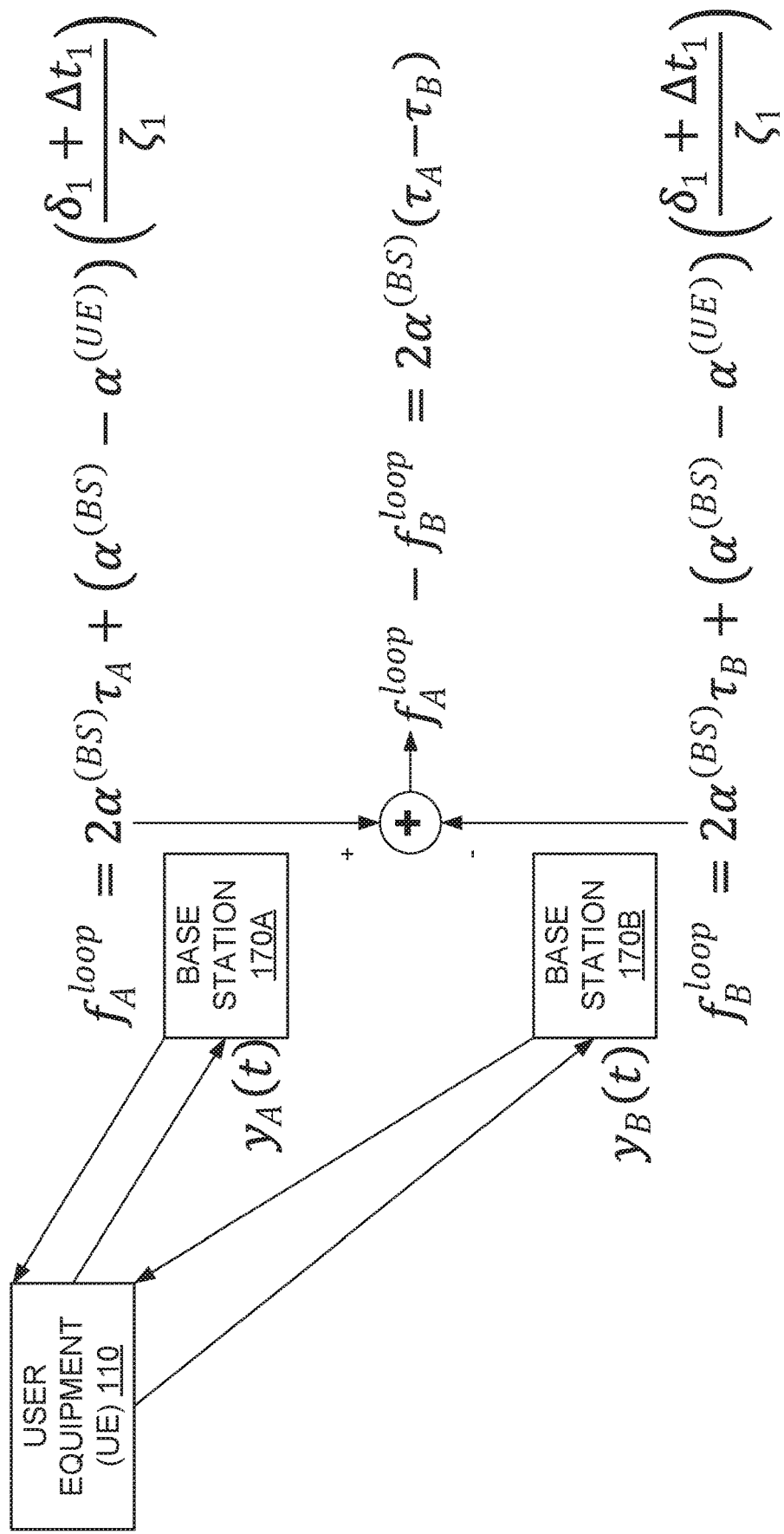
FIG. 11 illustrates performance of chirp sensing waveform looping at more than one base station with respect to a particular user equipment to reduce error in round trip time measurements in accordance with aspects of the present application.

However, the influence of the error term can be reduced by performing CSW looping at more than one BS 170 with respect to a particular UE 110, as illustrated in FIG. 11. A so-called "differential RTT" may be determined based on measurements made at the more than one BS 170. The differential RTT may be determined, in the case of two BSs 170, by subtracting an $f^{loop}$ determined at one BS 170 from an $f^{loop}$ determined at the other BS 170. The $f^{loop}$ determined at the first BS 170A may be expressed as $$f_A^{loop} = 2\alpha^{(BS)}\tau_A + (\alpha^{(BS)} - \alpha^{(UE)})\left(\frac{\delta_1 + \Delta t_1}{\zeta_1}\right)$$

and the $f^{loop}$ determined at the second BS 170B may be expressed as $$f_B^{loop} = 2\alpha^{(BS)}\tau_B + (\alpha^{(BS)} - \alpha^{(UE)})\left(\frac{\delta_1 + \Delta t_1}{\zeta_1}\right).$$

Subsequently, a differencing operation, $f_A^{loop} - f_B^{loop} = 2\alpha^{(BS)}(\tau_A - \tau_B)$, may be carried out. It can be shown mathematically that the differencing operation will eliminate the uncertainty that is caused by the unknown SFO, $\zeta_1$, if the interval between looping from the two BSs 170 is too delayed.

Differential looping enables digital looping by eliminating the residual ranging error that the unknown SFO, $\zeta_1$, is known to cause.

The estimation of the pose of the UE 110 using aspects of the present application is not restricted to range estimation. Indeed, other dimensions may also be estimated, such as velocity, angle and heading. The accurate estimation of these dimensions can be an invaluable source of knowledge that allows for mobility predictions, beamforming and proactive resource allocation.

Figure 12:
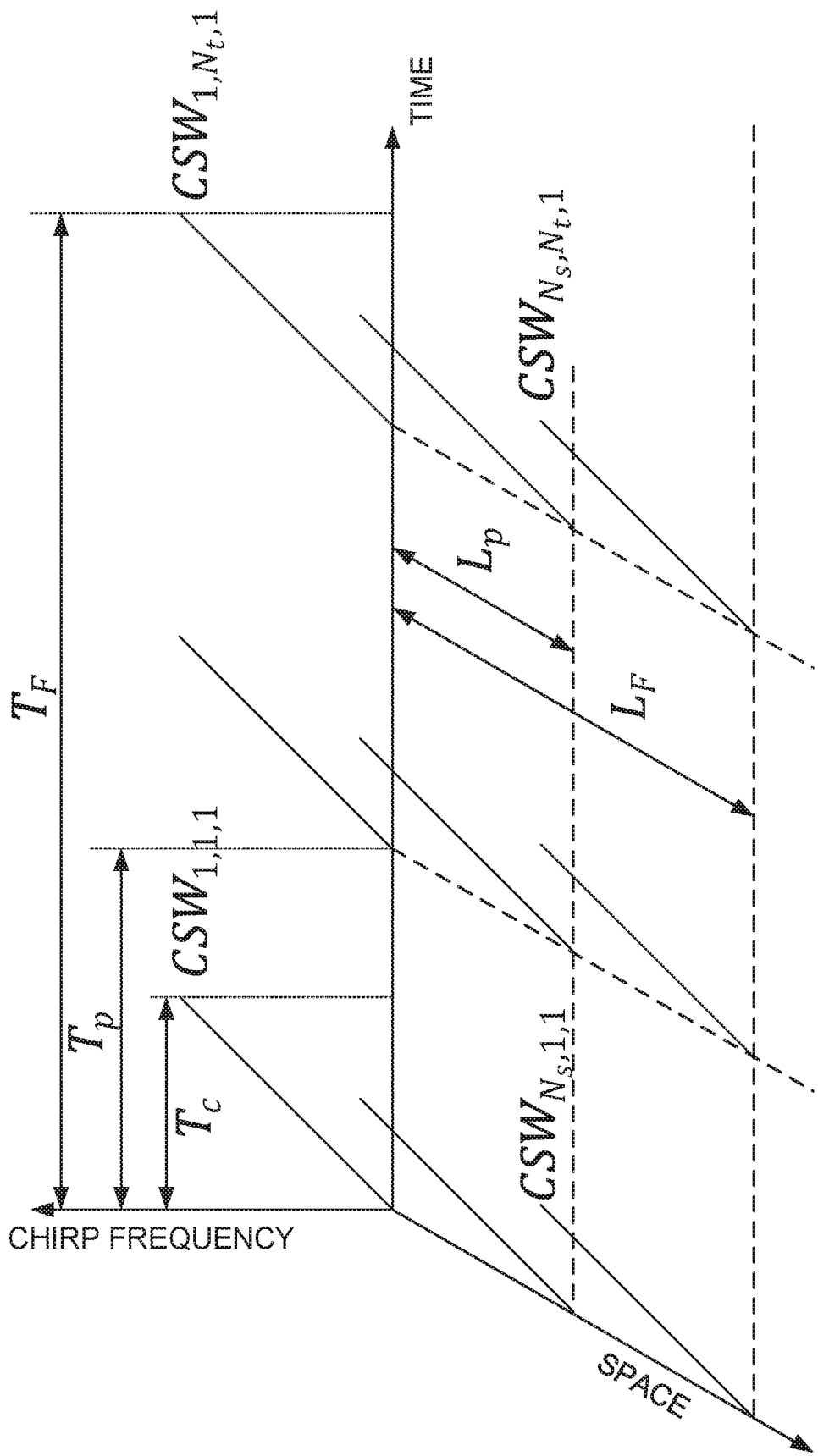
FIG. 12 illustrates transmission of a plurality of downlink chirp sensing waveform signals over a dense, multi-dimensional grid by a first base station among a plurality of base stations, in accordance with aspects of the present application.
Figure 13:
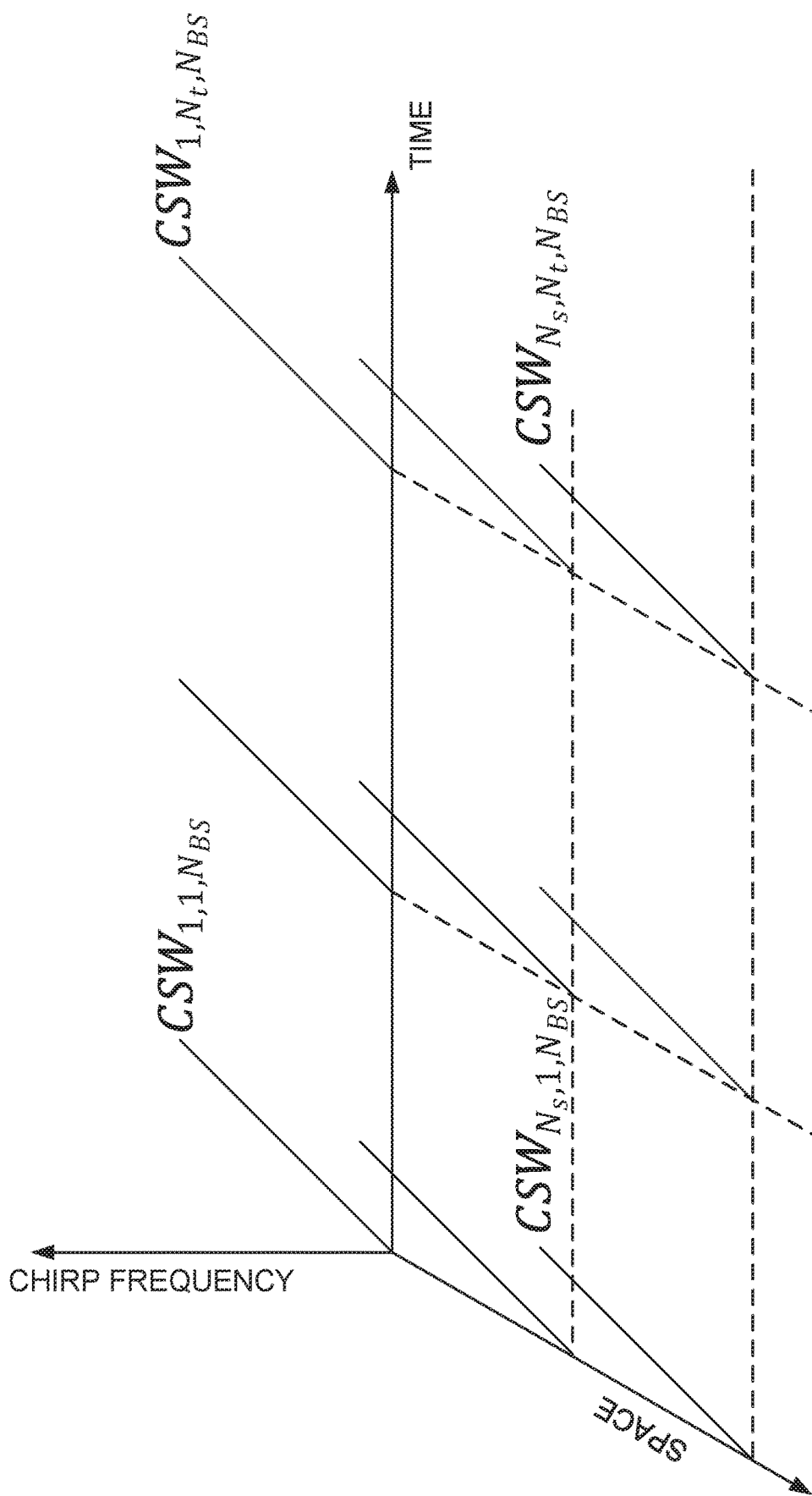
FIG. 13 illustrates transmission of a plurality of downlink chirp sensing waveform signals over a dense, multi-dimensional grid by a last base station among the plurality of base stations, in accordance with aspects of the present application.

To jointly estimate the range, velocity, angle and heading of the UE, the DL CSW signals may be sent across frequency, time, space and BSs, respectively. The transmission of a plurality of DL CSWs over a dense, multi-dimensional grid by a first BS 170, among $N_{BS}$ BSs 170, is illustrated in FIG. 12. FIG. 12 illustrates such features as chirp period, $T_c$, chirp interspacing, $T_p$, frame length, $T_F$, antenna interspacing, $L_p$, and antenna array length, $L_F$. The transmission of a plurality of DL CSWs over a dense, multi-dimensional grid by a $N_{BS}^{th}$ BS 170, among $N_{BS}$ BSs 170, is illustrated in FIG. 13.

Figure 14:
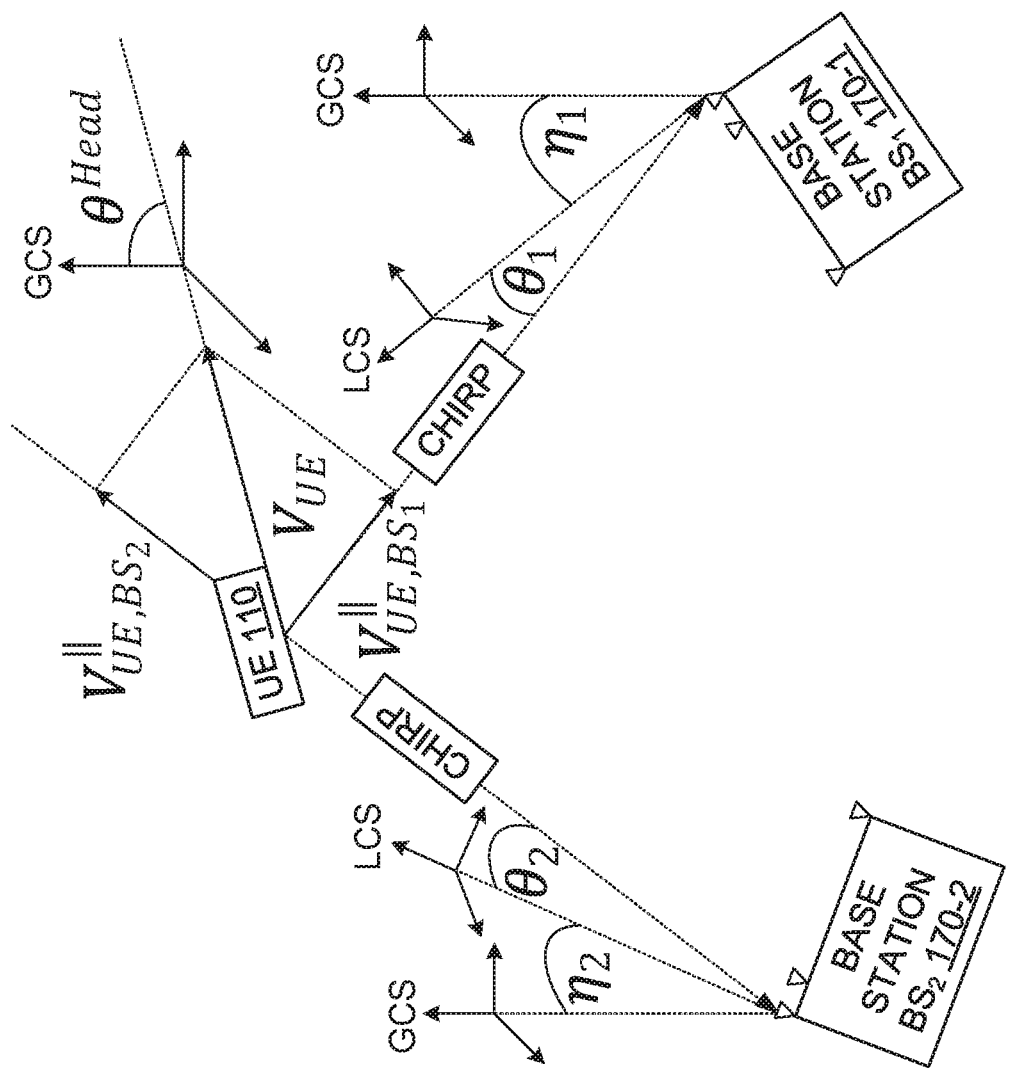
FIG. 14 illustrates a first base station and a second base station using downlink chirp sensing waveform signals to estimate a heading direction of a user equipment.

A given BS 170 may estimate a heading direction of a UE 110 by processing a velocity, estimated according to the velocity equation, $$V^{\parallel} = \frac{\phi_1^{loop}(r_2) - \phi_1^{loop}(r_1)}{T_p\left(\frac{(2\alpha_0 - \alpha_1)(t_1 + \delta_1)}{c} - \frac{2}{\lambda_0}\right)},$$

and an angle, estimated according to the angle equation, $$\theta_0 = \sin^{-1}\left(\frac{\Delta\phi^{loop}(s_2, s_1)}{L_p\left(\frac{(2\alpha_0 - \alpha_1)(t_1 + \delta_1)}{c} - \frac{2}{\lambda_0}\right)}\right),$$

across multiple BSs 170. The heading may be expressed in relation to a global coordinate system (GCS). FIG. 14 illustrates a first BS 170-1, $BS_1$, and a second BS 170-2, $BS_2$, using DL CSW signals to estimate a heading direction of a UE 110.

Based upon receipt of an UL cloned CSW signal from the UE 110, the first BS 170-1 obtains an AoA estimate, $\theta_1$, in the local coordinate system (LCS). The first BS 170-1 also obtains a velocity projection, $V_{UE,BS_1}^{\parallel}$. The first BS 170-1 has an orientation, $\eta_1$, in the GCS. Based upon receipt of an UL cloned CSW signal from the UE 110, the second BS 170-2 obtains an AoA estimate, $\theta_2$, in the LCS. The second BS 170-2 also obtains a velocity projection, $V_{UE,BS_2}^{\parallel}$. The second BS 170-2 has an orientation, $\eta_2$, in the GCS. $V_{UE}$ On the basis of the estimates $V_{UE,BS_1}^{\parallel}$ and $\theta_1$ obtained at the first BS 170-1 and the estimates $V_{UE,BS_2}^{\parallel}$ and $\theta_2$ obtained at the second BS 170-2, an estimate for the heading, $\theta^{Head}$, of the UE 110 may be found using $$\theta^{Head} = \arctan\left(\frac{V_{UE,BS_1}^{\parallel} \sin(\theta_1 + \eta_1) + V_{UE,BS_2}^{\parallel} \sin(\theta_2 + \eta_2)}{V_{UE,BS_1}^{\parallel} \cos(\theta_1 + \eta_1) + V_{UE,BS_2}^{\parallel} \cos(\theta_2 + \eta_2)}\right).$$

It may be that estimates from more than two BSs 170 are available. Where S is representative of a set of independent pairs of BSs 170, an estimate for the heading, $\theta^{Head}$, of the UE 110 may be found using $$\theta^{Head} = \arctan\left(\frac{\Sigma_{(j,k)\in S}(V_{UE,BS_j}^{\parallel} \sin(\theta_j + \eta_j) + V_{UE,BS_k}^{\parallel} \sin(\theta_k + \eta_k))}{\Sigma_{(j,k)\in S}(V_{UE,BS_j}^{\parallel} \cos(\theta_j + \eta_j) + V_{UE,BS_2}^{\parallel} \cos(\theta_k + \eta_k))}\right).$$

Notably, under those conditions wherein estimates from more than two BSs 170 are available, the preceding equation can be used to estimate an unknown AoA, $\theta_k$, for the $k^{th}$ BS 170-k from those AoAs estimated at other BSs 170 with the aid of already estimated heading, $\theta^{Head}$.

While the approach for estimating the heading, $\theta^{Head}$, of the UE 110 of FIG. 14 has been presented in two dimensions, it may be shown that extension of this approach to three dimensions is well within the capabilities of a person of ordinary skill in the relevant art.

Figure 15:
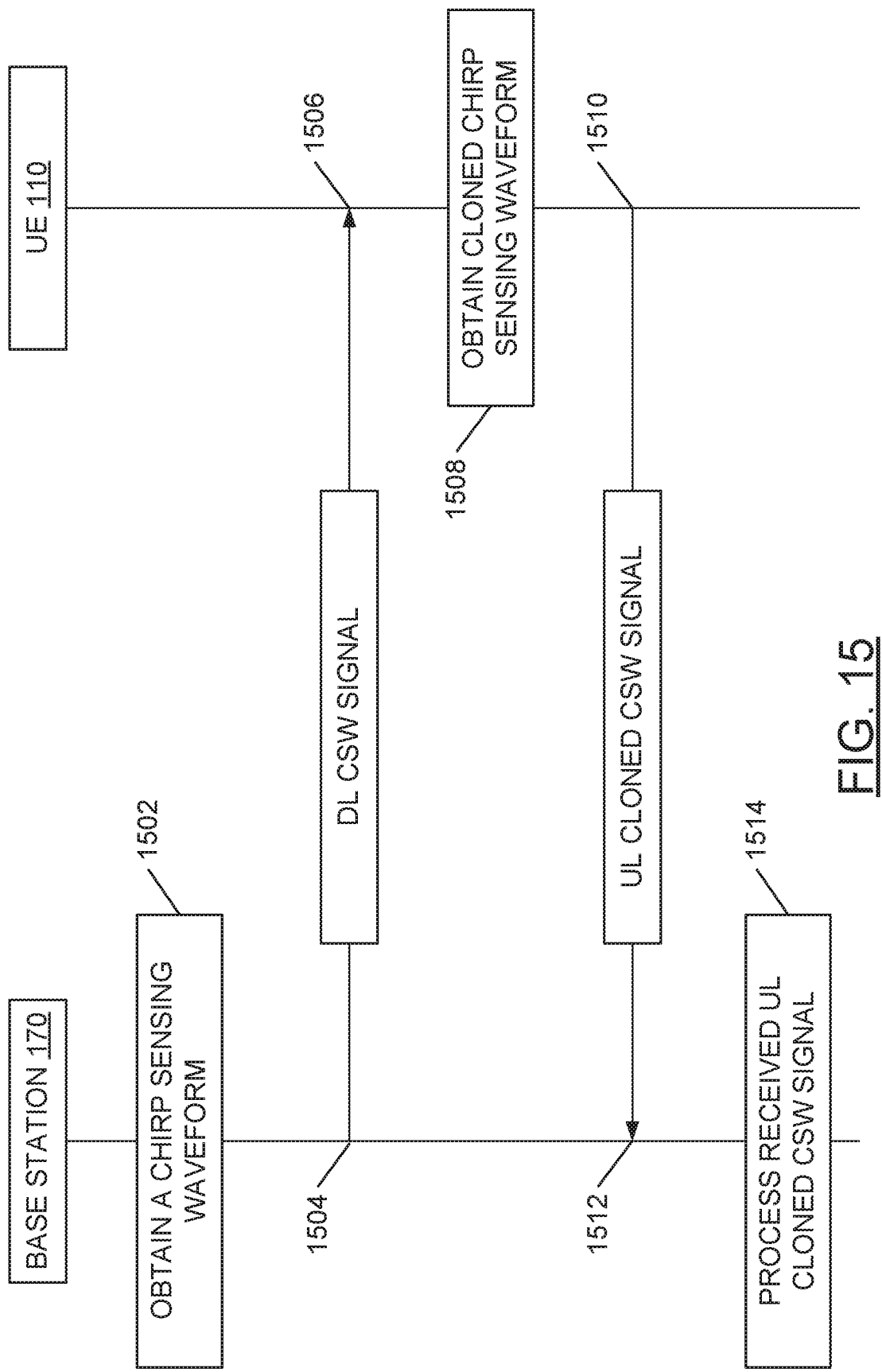
FIG. 15 illustrates, in a signal flow diagram, a simplified summary of aspects of the present application.

FIG. 15 illustrates, in a signal flow diagram, a simplified summary of aspects of the present application. The BS 170 initially obtains (step 1502) a chirp sensing waveform. The BS 170 transmits (step 1504) a DL CSW signal based on the chirp sensing waveform. The UE 110 receives (step 1506) the DL CSW signal and obtains (step 1508) a cloned chirp sensing waveform, which includes a parameter that can be uniquely associated with the UE 110. The UE 110 transmits (step 1510) a UL cloned CSW signal based on the cloned chirp sensing waveform. The BS 170 receives (step 1512) the UL cloned CSW signal and processes (step 1514) the UL cloned CSW signal to estimate a pose for the transmitter of the cloned CSW signal and associate the estimated pose with the identity of the UE 110.

Figure 16:
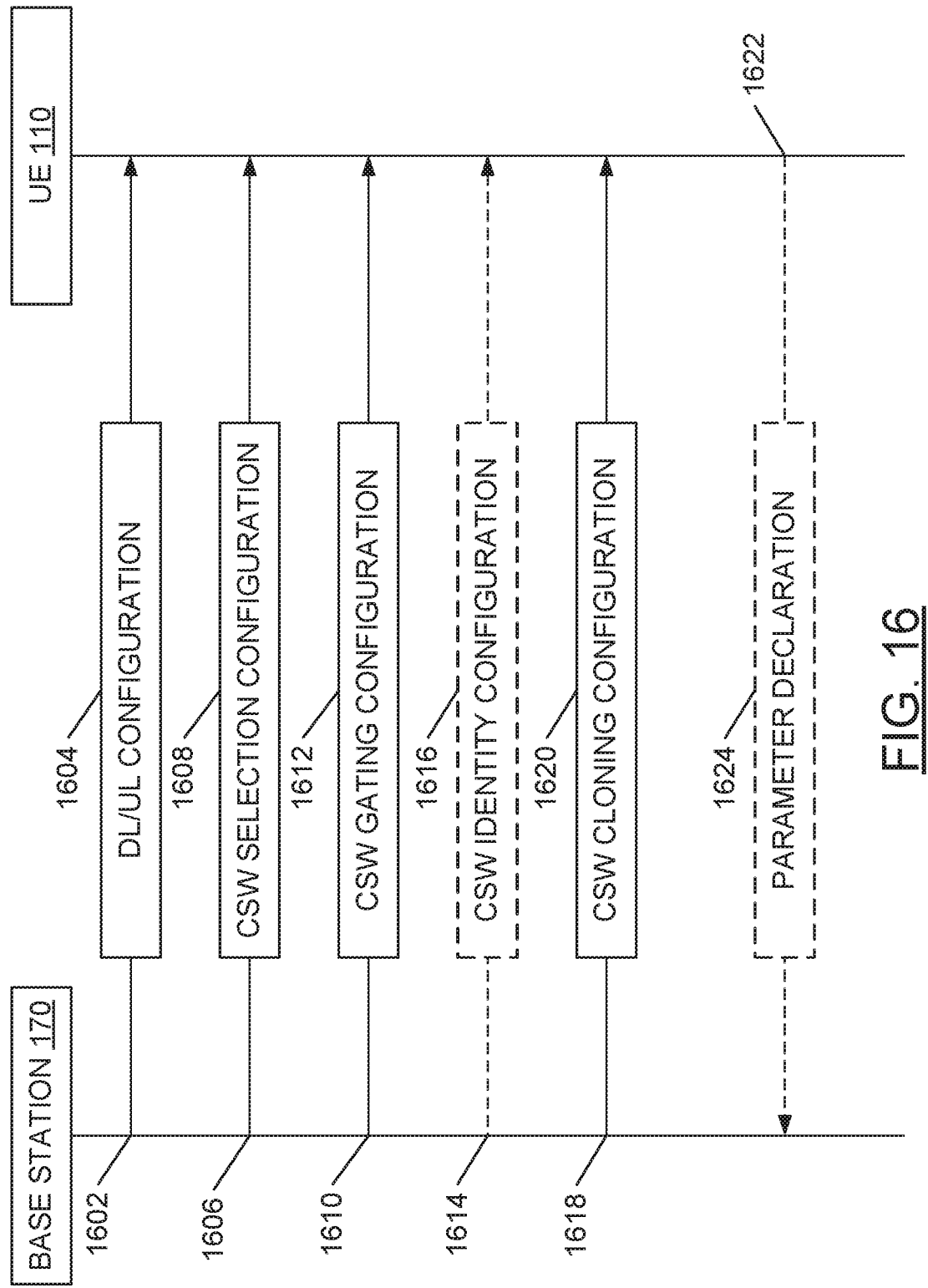
FIG. 16 illustrates, in a signal flow diagram, configuration messaging according to aspects of the present application.

FIG. 16 illustrates, in a signal flow diagram, configuration messaging according to aspects of the present application. That is, to arrange smooth operation according to the signal flow diagram of FIG. 15, the BS 170 (or other network element) configures the UE 110 using messaging. The messaging may be transmitted to the UE in Downlink Control Information (DCI) and/or in a Radio Resource Control (RRC) configuration, for example, though any suitable form of configuration messaging may be used.

For example, the BS 170 may transmit (step 1602) a DL/UL Configuration message 1604 to configure the UE 110 for reception and cloning of CSW signals. Additionally, the BS 170 may transmit (step 1606) a CSW Selection Configuration (CSWSC) message 1608 to indicate, to the UE 110, a center frequency to which to tune so as to select the chirp that will be transmitted in step 1504 (FIG. 15). The CSWSC message 1608 may be transmitted (step 1606) to a group of UEs 110.

Furthermore, the BS 170 may transmit (step 1610) a CSW Gating Configuration (CSWGC) message 1612 to indicate, to the UE 110, a beginning and a duration of a window with which to gate the selected chirp. Optionally, the BS 170 may transmit (step 1614) a CSW Identity Configuration (CSWIC) message 1616 to indicate, to the UE 110, an orthogonalization code (see $p_1(t)$ in FIG. 6) to be applied to the selected chirp. A known UE-specific value that may be used for the orthogonalization code is a Radio Network Temporary Identifier (RNTI) and, more particularly, the known Paging RNTI (P-RNTI) may be used. In addition, the BS 170 may transmit (step 1618) a CSW Cloning configuration (CSWCC) message 1620 to indicate, to the UE 110, one or more of: a center frequency; a deferment delay, $\delta_j$; a bandwidth; a CSW slope; and a transmit power to use when transmitting a UL cloned CSW signal. Any combination of the above transmissions and configuration messages may be combined into one or more transmissions and messages.

Using the values transmitted (in step 1614) in the CSWCC message 1616 and transmitted (in step 1618) the CSWIC message 1620, the BS 170 may maintain a matched filter (digital) or a reference chirp waveform (analog) for the UE 110 (and every other UE 110).

Using the center frequency transmitted (in step 1606) in the CSWSC message 1608, the BS 170 transmits (step 1504, FIG. 15) a DL CSW signal.

Upon receipt (step 1506) of the DL CSW signal, the UE 110 obtains (step 1508) and transmits (step 1510) a UL cloned CSW signal using the values specified in the CSWCC message 1620. The UE 110 may use the center frequency indicated in the CSWSC message 1608 when receiving (step 1506) the DL CSW signal.

As part of the exchange of messages for configuration, the UE 110 may optionally transmit (step 1622) a parameter declaration message 1624 to indicate, to the BS 170, values of various internal parameters, of which the BS 170 may be unaware. The various internal parameters may, for one example, include the processing delay, $t_{UE}$, at the UE 110. Notably, the processing delay, $t_{UE}$, is distinct from the deferment delay, $\delta_j$. The various internal parameters may, for another example, include a clock/sampling offset.

To this point, the source of the DL CSW signal and the configuration messages has been described as the BS 170. According to aspects of the present application, the source of the DL CSW signal and the configuration messages may be another UE 110, so that a sidelink version of semi-active sensing for pose estimation may be carried out.

Notably, it may be considered reasonable to ask "why not use the classical RTT ranging method?" since the classical RTT ranging method is also robust against clock bias (time) and frequency mismatch.

In a first part of the answer, it is noted that the RTT-based method is only able to deal with the clock bias without dealing with the clock skew. The clock skew can be a significant problem with precision positioning, especially when UEs are not able track the synchronization parameters on a frequent basis.

In a second part of the answer, it is noted that the ranging accuracy of the RTT-based method is restricted to the digital processing capabilities of the UEs. In contrast, aspects of the present application may be implemented in both analog and digital domains, enabling precision localization even for UE devices hampered by low-grade digital processing capabilities.

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
   receiving, by an apparatus, a configuration message;
   receiving, by the apparatus, a first chirp sensing waveform signal, the first chirp sensing waveform signal having a first frequency bandwidth; and
   transmitting, by the apparatus, a second chirp sensing waveform signal based on a portion of the first chirp sensing waveform signal, the second chirp sensing waveform signal having a second frequency bandwidth less than the first frequency bandwidth, and the portion of the first chirp sensing waveform signal being uniquely associated with the apparatus;

wherein the configuration message includes an indication of the portion of the first chirp sensing waveform signal to be uniquely associated with the apparatus.

2. The method of claim 1, wherein the configuration message comprises a gating delay for the portion of the first chirp sensing waveform uniquely associated with the apparatus.

3. The method of claim 1, wherein the second chirp sensing waveform signal is further based on a modified chirping coefficient of the first chirp sensing waveform signal, the modified chirping coefficient being uniquely associated with the apparatus.

4. The method of claim 1, wherein the second chirp sensing waveform signal is further based on a deferment delay of the first chirp sensing waveform signal, the deferment delay being uniquely associated with the apparatus.

5. The method of claim 1, wherein the second chirp sensing waveform signal is further based on a combination of the first chirp sensing waveform signal and an orthogonalization code uniquely associated with the apparatus.

6. The method of claim 5, wherein the orthogonalization code comprises a Paging Radio Network Temporary Identifier.

7. The method of claim 1, wherein the configuration message comprises a duration for the portion of the first chirp sensing waveform uniquely associated with the apparatus.

8. A method comprising:
transmitting, by the base station to an apparatus, a configuration message;
transmitting, by the base station, a first chirp sensing waveform signal, the first chirp sensing waveform signal having a first frequency bandwidth; and
receiving, by the base station, a second chirp sensing waveform signal from the apparatus, the second chirp sensing waveform signal based on a portion of the first chirp sensing waveform signal, the second chirp sensing waveform signal having a second frequency bandwidth less than the first frequency bandwidth, and the portion of the first chirp sensing waveform signal being uniquely associated with the apparatus;
wherein the configuration message includes an indication of the portion of the first chirp sensing waveform signal to be uniquely associated with the apparatus.

9. The method of claim 8, wherein the configuration message comprises a gating delay the portion of the first chirp sensing waveform uniquely associated with the apparatus.

10. The method of claim 8, wherein the configuration message comprises a duration for the portion of the first chirp sensing waveform uniquely associated with the apparatus.

11. An apparatus comprising:
a processor; and
a non-transitory computer readable storage medium storing programming for execution by the processor, the programming including instructions to:
receive a configuration message;
receive a first chirp sensing waveform signal, the first chirp sensing waveform signal having a first frequency bandwidth; and
transmit a second chirp sensing waveform signal based on a portion of the first chirp sensing waveform signal, the second chirp sensing waveform signal having a second frequency bandwidth less than the first frequency bandwidth, and the portion of the first chirp sensing waveform signal being uniquely associated with the apparatus;
wherein the configuration message includes an indication of the portion of the first chirp sensing waveform signal to be uniquely associated with the apparatus.

12. The apparatus of claim 11, wherein the configuration message comprises a gating delay for the portion of the first chirp sensing waveform uniquely associated with the apparatus.

13. The apparatus of claim 11, wherein the second chirp sensing waveform signal is further based on a modified chirping coefficient of the first chirp sensing waveform signal, the modified chirping coefficient being uniquely associated with the apparatus.

14. The apparatus of claim 11, wherein the second chirp sensing waveform signal is further based on a deferment delay of the first chirp sensing waveform signal, the deferment delay being uniquely associated with the apparatus.

15. The apparatus of claim 11, wherein the second chirp sensing waveform signal is further based on a combination of the first chirp sensing waveform signal and an orthogonalization code uniquely associated with the apparatus.

16. The apparatus of claim 15, wherein the orthogonalization code comprises a Paging Radio Network Temporary Identifier.

17. The apparatus of claim 11, wherein the configuration message comprises a duration for the portion of the first chirp sensing waveform uniquely associated with the apparatus.

18. An apparatus comprising:
a processor; and
a non-transitory computer readable storage medium storing programming for execution by the processor, the programming including instructions to:
transmit, to a user equipment (UE) apparatus, a configuration message;
transmit a first chirp sensing waveform signal, the first chirp sensing waveform signal having a first frequency bandwidth; and
receive a second chirp sensing waveform signal from the UE apparatus, the second chirp sensing waveform signal based on a portion of the first chirp sensing waveform signal, the second chirp sensing waveform signal having a second frequency bandwidth less than the first frequency bandwidth, and the portion of the first chirp sensing waveform signal being uniquely associated with the UE apparatus;
wherein the configuration message includes an indication of the portion of the first chirp sensing waveform signal to be uniquely associated with the UE apparatus.

19. The apparatus of claim 18, wherein the configuration message comprises a gating delay for the portion of the first chirp sensing waveform uniquely associated with the UE apparatus.

20. The apparatus of claim 18, wherein the configuration message comprises a duration for the portion of the first chirp sensing waveform uniquely associated with the apparatus.

* * * * *